United States Patent
Yang et al.

(10) Patent No.: US 10,986,053 B2
(45) Date of Patent: Apr. 20, 2021

(54) DUAL SERVER SYSTEM FOR SENDING A LARGE EMAIL ATTACHMENT

(71) Applicant: Apple Inc., Cupertino, CA (US)

(72) Inventors: Lawrence Y. Yang, Bellevue, WA (US); Stephen O. Lemay, Palo Alto, CA (US); Tiffany S. Jon, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 112 days.

(21) Appl. No.: 15/890,004

(22) Filed: Feb. 6, 2018

(65) Prior Publication Data

US 2018/0159807 A1  Jun. 7, 2018

Related U.S. Application Data

(62) Division of application No. 14/700,029, filed on Apr. 29, 2015, now Pat. No. 9,887,943.
(Continued)

(51) Int. Cl.
*G06F 15/16* (2006.01)
*H04L 12/58* (2006.01)
(Continued)

(52) U.S. Cl.
CPC .......... *H04L 51/08* (2013.01); *G06Q 10/107* (2013.01); *H04L 51/063* (2013.01); *H04L 67/1095* (2013.01)

(58) Field of Classification Search
CPC ..... G06Q 10/107; H04L 51/063; H04L 51/08; H04L 67/1095
(Continued)

(56) References Cited

U.S. PATENT DOCUMENTS 7,054,905 B1  5/2006 Hanna et al.
2003/0028647 A1*  2/2003 Grosu .................. H04L 51/066
                                                709/227
(Continued)

FOREIGN PATENT DOCUMENTS

CN    101695202 A    4/2010
CN    101764766 B    1/2012
(Continued)

OTHER PUBLICATIONS

"A Universal Method for Managing E-Mail Attachments", IP.com Journal, IP.com Inc., West Henrietia, NY, US, XP013022241, ISSN: 1533-0001, Nov. 19, 2004, 3 pages.
(Continued)

Primary Examiner — Liang Che A Wang
(74) Attorney, Agent, or Firm — Dentons US LLP

(57) ABSTRACT

An electronic device with a touch-sensitive surface and display can execute a messaging application. The messaging application provides options for sending a message with a large attachment. In one option it allows for sending a message with a large attachment by uploading and storing the attachment on a cloud server, embeds a link to the storage location in the message, and sends the message without the attachment. The messaging application may also include a UI element in the message that includes an indicator about the status of the stored attachment. Furthermore, the messaging application may embed in the message a smaller sized version of the attachment before sending the message. The status indicator may display whether the link to the storage location has expired or whether the attachment has previously been retrieved from the cloud server.

9 Claims, 31 Drawing Sheets

Related U.S. Application Data

(60) Provisional application No. 62/006,210, filed on Jun. 1, 2014.

(51) Int. Cl.
*G06Q 10/10* (2012.01)
*H04L 29/08* (2006.01)

(58) Field of Classification Search
USPC .................. 709/217, 219, 225, 226, 229
See application file for complete search history.

(56) References Cited

U.S. PATENT DOCUMENTS

| | | | |
|---|---|---|---|
| 2004/0186894 A1* | 9/2004 | Jhingan | G06Q 10/107 709/207 |
| 2006/0036865 A1* | 2/2006 | Brown | H04L 51/063 713/181 |
| 2006/0168012 A1* | 7/2006 | Rose | H04L 67/104 709/206 |
| 2007/0143419 A1* | 6/2007 | Plas | G06Q 10/107 709/206 |
| 2011/0238859 A1* | 9/2011 | Kitagata | G06Q 10/10 709/232 |
| 2012/0110097 A1* | 5/2012 | Singh | H04L 51/08 709/206 |
| 2015/0350133 A1* | 12/2015 | Murphy | H04L 67/42 709/203 |
| 2015/0350134 A1 | 12/2015 | Yang et al. | |

FOREIGN PATENT DOCUMENTS

| | | |
|---|---|---|
| CN | 102624649 A | 8/2012 |
| CN | 103580991 A | 2/2014 |
| TW | 201417538 A | 5/2014 |
| WO | 2015/187275 A1 | 12/2015 |

OTHER PUBLICATIONS

Brinkmann, Martin, "Using Thunderbird's New Filelink Feature for Large File Attachments", retrieved from the Internet: URL: "http://www.ghacks.net/2012/04/27/usingthunderbirds-new-filelink-feature-for-large-file-attachments", Apr. 27, 2012, 6 pages.

Corrected Notice of Allowance received for U.S. Appl. No. 14/700,029, dated Dec. 13, 2017, 4 pages.

"Create Fixed Size Thumbnails With ImageMagick", available at: "http://cubiq.org/create-fixed-size-thumbnails-with-imagemagick", Jan. 3, 2009, 6 pages.

"Efficiently Generating Thumbnails with ImageMagick and Convert", available at: https://stackoverflow.com/questions/12206217/efficiently-generating-thumbnails-with-imagemagick-and-convert, Aug. 30, 2012, 4 pages.

International Preliminary Report on Patentability received for PCT Patent Application No. PCT/US2015/028628, dated Dec. 15, 2016, 9 pages.

International Search Report and Written Opinion received for PCT Patent Application No. PCT/US2015/028628, dated Jun. 24, 2015, 11 pages.

Klosowski, Thorin, "How to Turn Mac Mail Into a Fantastic Email Client", Retrieved from the Internet: URL: http://lifehacker.com/how-to-turn-mac-mail-into-a-fantastic-emailclient-926121336, Jul. 29, 2013, 4 pages.

Non-Final Office Action received for U.S. Appl. No. 14/700,029, dated Mar. 14, 2017, 9 pages.

Notice of Allowance received for U.S. Appl. No. 14/700,029, dated Sep. 25, 2017, 13 pages.

Office Action received for European Patent Application No. 15723081.4, dated Sep. 26, 2017, 8 pages.

Office Action received for Taiwanese Patent Application No. 104116113, dated Dec. 23, 2016, 4 pages.

Office Action received for Taiwanese Patent Application No. 104116113, dated Jun. 2, 2017, 4 pages.

Office Action received for Taiwanese Patent Application No. 104116113, dated Aug. 5, 2016, 16 pages.

"Proactive Usage of a Document Storage System to Facilitate More Efficient E-Mail Attachment Transfer", IP.com Journal, IP.com Inc., West Henrietia, NY, US, XP013142935, ISSN: 1533-0001, Dec. 8, 2010, 3 pages.

Office Action received for Taiwanese Patent Application No. 104116113, dated Mar. 31, 2018, 6 pages (2 pages of English Translation and 4 pages of Official Copy).

Summons to Attend Oral proceedings received for European Patent Application No. 15723081.4, dated Jul. 19, 2018, 11 pages.

Notice of Allowance received for Taiwanese Patent Application No. 104116113, dated Oct. 16, 2018, 5 pages (2 pages of English Translation and 3 pages of Official Copy).

Office Action received for Chinese Patent Application No. 201580028706.1, dated Aug. 20, 2018, 14 pages (6 pages of English Translation and 8 pages of Official Copy).

Decision to Refuse received for European Patent Application No. 15723081.4, mailed on Mar. 26, 2019, 14 pages.

Minutes of Oral Proceedings received for European Patent Application No. 15723081.4, mailed on Mar. 26, 2019, 5 pages.

Office Action received for Chinese Patent Application No. 201580028706.1, dated May 7, 2019, 12 pages (6 pages of English Translation and 6 pages of Official Copy).

\* cited by examiner

DUAL SERVER SYSTEM FOR SENDING A LARGE EMAIL ATTACHMENT

CROSS REFERENCE TO RELATED APPLICATIONS

The application claims the benefit of Provisional Application No. 62/006,210, filed on Jun. 1, 2014, the content of which is incorporated herein by reference.

BACKGROUND

1. Field of Technology

The embodiments herein generally relate to sending messages that include large-sized attachments between electronic devices, including devices with touch screen displays. More particularly, the embodiments relate to user interfaces and gestures on such devices for sending these messages.

2. Background

As multimedia and other social media is shared among many users of electronic computing devices, sending messages between users, which include large multimedia attachments, is becoming increasingly popular. With the increased demand for email bandwidth, many email providers are imposing a size limitation on the email messages that users can send using the providers' services. Large multimedia or content files are therefore shared through file-sharing services, but not by including these files into email messages. A user's experience in sending emails is therefore complicated because of the inconvenience of having to invoke two or more separate services to deliver a message that includes large sized materials such as movies, high resolution photos, presentations and archives.

SUMMARY

An electronic device with a touch-sensitive surface and display can execute a messaging application configured to manage emails with large attachments. Computer-implemented methods, a device including instructions or means for performing any of the methods, and a computer readable storage medium including instruction to perform any of the methods are disclosed.

In one embodiment, a device executing a messaging application receives a request to send an email message. In response to receiving the request, the device determines whether the size of the attachment exceeds a threshold. In response to determining that the size exceeds the threshold, the device sends a request to a server for uploading the attachment to the server. In response to receiving a positive confirmation from the server to the uploading request, the device provides an option to upload the attachment to the server and to embed in the email message a link to the location of the attachment on the server. And in response to receiving a selection of the upload and embed option, the device adds an UI element and a version of the attachment to the email message, where the UI element comprises the link to the location of the attachment on the cloud server, and wherein the version has a size smaller than the threshold. The device sends the email message.

In another embodiment, a device receives a request to store an attachment of an email message. In response to receiving the request, the device determines whether the size of the attachment exceeds a threshold. In accordance with a determination that the size exceeds the threshold, the device calculates storage space at a location that is configured to store the attachment that is based on storage parameters. In accordance with a determination that the storage space is sufficient to store the attachment, the device sends a first confirmation that comprising a link to the location and validity information.

In yet another embodiment, a device receives an email message that comprises a link to a location of an attachment associated with the email message on a server and validity information of the link. In response to an action opening the email message, the device determines whether the link is valid; and in response to an action selecting the link to the location of the attachment and in accordance with a determination that the link is valid, it sends a request to the server to retrieve the attachment. The device then retrieves the attachment from the server and upon retrieving the attachment, updates the validity information of the link to indicate that the attachment has been retrieved from the server, and stores the email message with the updated validity information and with the attachment being embedded within the email message.

In one embodiment, a device receives an email message comprising a link to a location of an attachment associated with the email on a server and validity information of the link. Upon receiving a selection of the link to the location of the attachment and the link being valid, it sends a request to the server to retrieve the attachment. Upon determining that the attachment has been retrieved from the server, the device updates the visible indication of the validity status to indicate that the attachment has been retrieved from the server.

BRIEF DESCRIPTION OF DRAWINGS

For a better understanding of the various described embodiments, reference should be made to the Description of Embodiments below, in conjunction with the following drawings in which like reference numerals refer to corresponding parts throughout the figures.

FIGS. 8A and 8B illustrate gestures for and methods of composing a message including a large attachment in an application view of an email application, according to some embodiments.

FIGS. 11A-D illustrate application views of messages including an embedded link to an attachment stored on a cloud servers and download gestures, according to some embodiments.

FIGS. 13A-C illustrate application views including messages with various UI elements and download indicators, according to some embodiments.

Figure 1A:
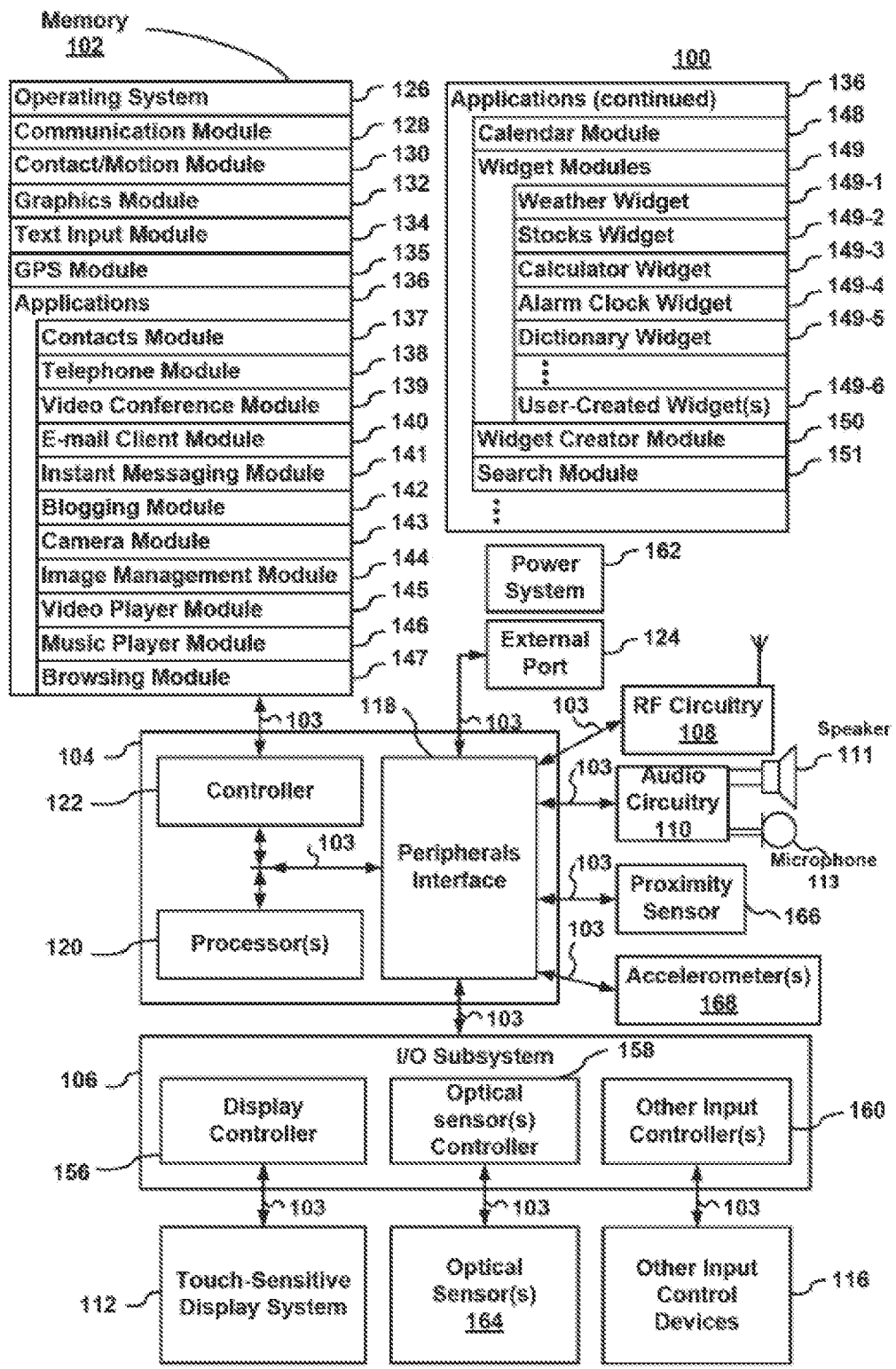
FIG. 1A is a block diagram illustrating a portable multifunction device with a touch-sensitive display in accordance with some embodiments.

The figures depict, and the detail description describes, various non-limiting embodiments for purposes of illustration only. One skilled in the art will readily recognize from the following discussion that alternative embodiments of the structures and methods illustrated herein may be employed without departing from the principles described herein.

DETAILED DESCRIPTION

Exemplary Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer with a touch-sensitive surface (e.g., a touch screen display and/or a touch pad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch sensitive surface, or to a substitute (proxy) for the force or pressure of a contact on the touch sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU 120 and the peripherals interface 118, is, optionally, controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.1 la, IEEE 802.1 lb, IEEE 802.1 lg and/or IEEE 802.1 ln), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power convertor or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device, so that the touch screen display is enabled for use as a viewfinder for still and/or video image acquisition. In some embodiments, another optical sensor is located on the front of the device so that the user's image is, optionally, obtained for videoconferencing while the user views the other video conference participants on the touch screen display.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 optionally also includes one or more proximity sensors 166. FIG. 1A shows proximity sensor 166 coupled to peripherals interface 118. Alternately, proximity sensor 166 is coupled to input controller 160 in I/O subsystem 106. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
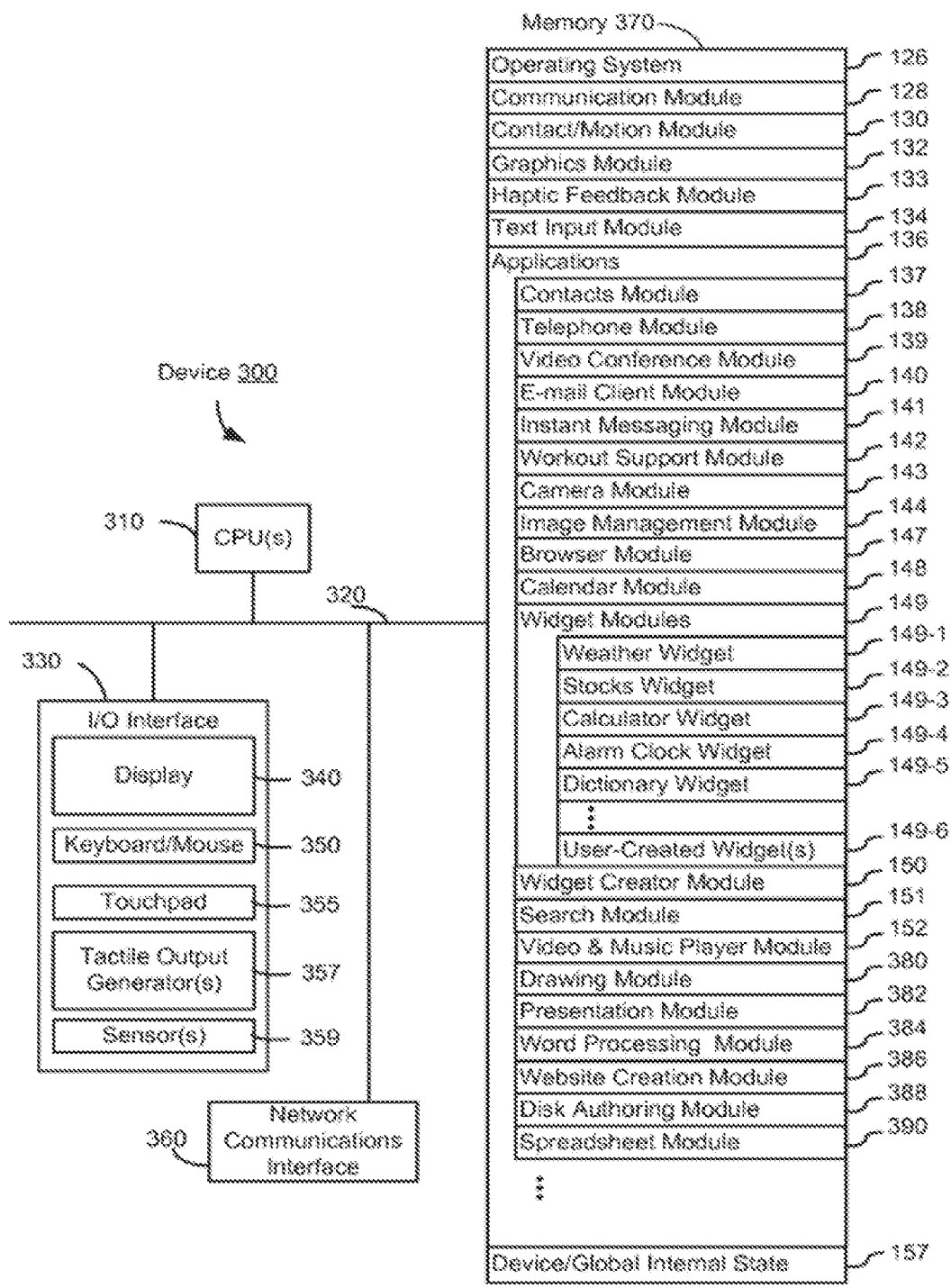
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 optionally detects contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined thresholds values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
contacts module 137 (sometimes called an address book or contact list);
telephone module 138;
video conferencing module 139;
e-mail or email client module 140;
instant messaging (IM) module 141;
workout support module 142;
camera module 143 for still and/or video images;
image management module 144;
browser module 147;
calendar module 148;
widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
widget creator module 150 for making user-created widgets 149-6;
search module 151;
video and music player module 152, which is, optionally, made up of a video player module and a music player module;
notes module 153;
map module 154; and/or
online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), email address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 are, optionally, used to enter a sequence of characters corresponding to a telephone number, access one or more telephone numbers in address book 137, modify a telephone number that has been entered dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112 display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134 GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 56, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112 display system controller 156, contact module 130, graphics module 132, text input module 134, and browser module 147, the widget creator module 150 are, optionally, used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111 RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 are, optionally, used to receive, display, modify, and store maps and data associated with maps (e.g., driving directions; data on stores and other points of interest at or near a particular location; and other location based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
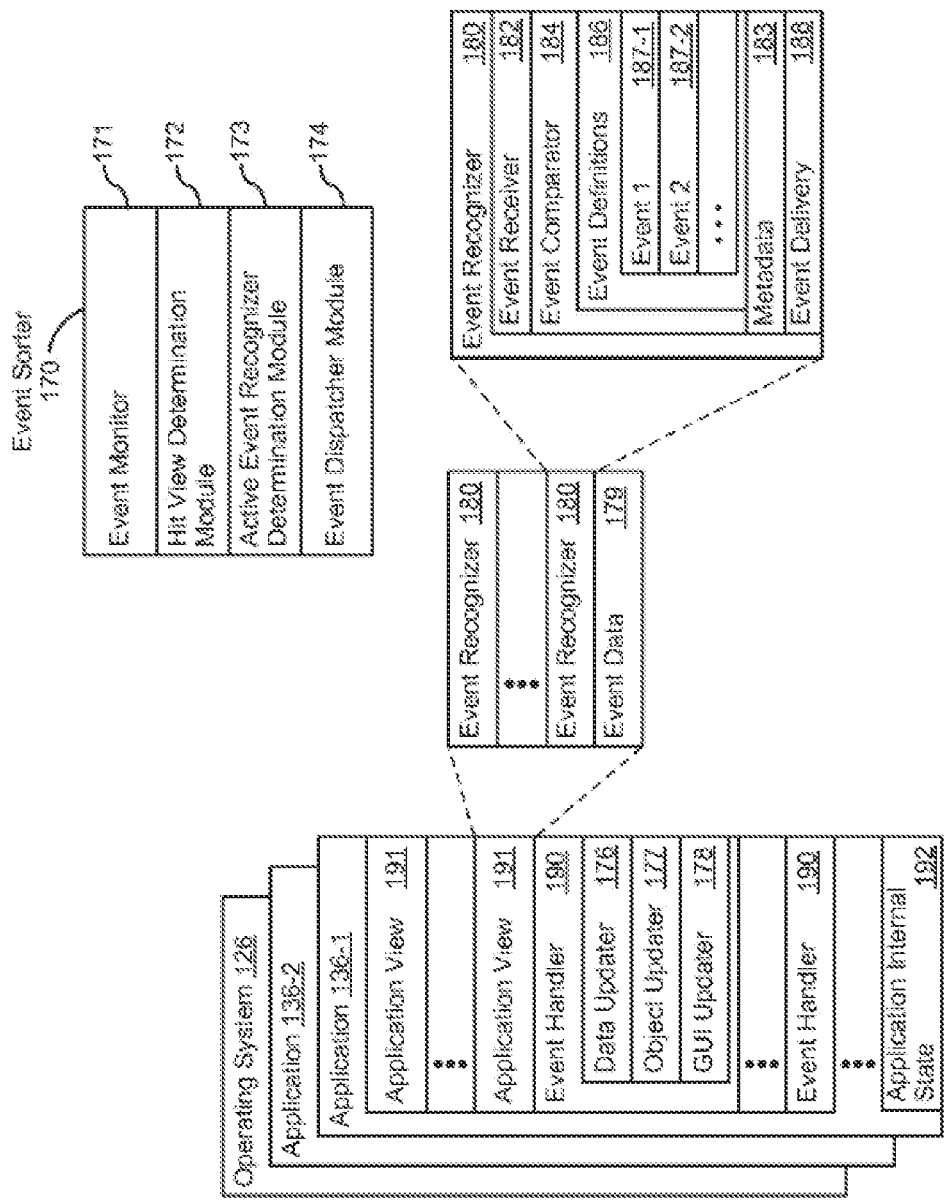
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-13, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that e series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
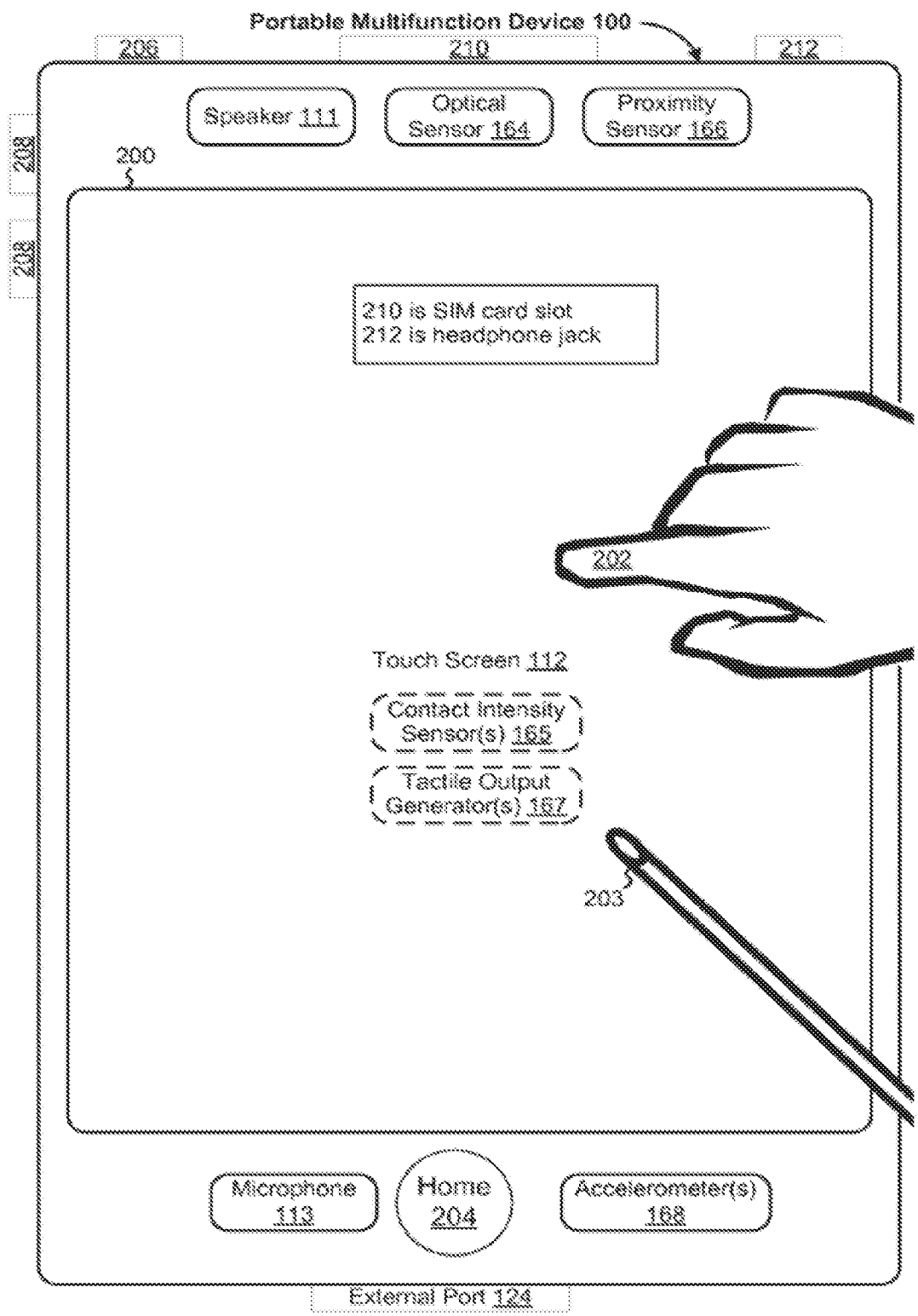
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that is, optionally, implemented on portable multifunction device 100.

Figure 4A:
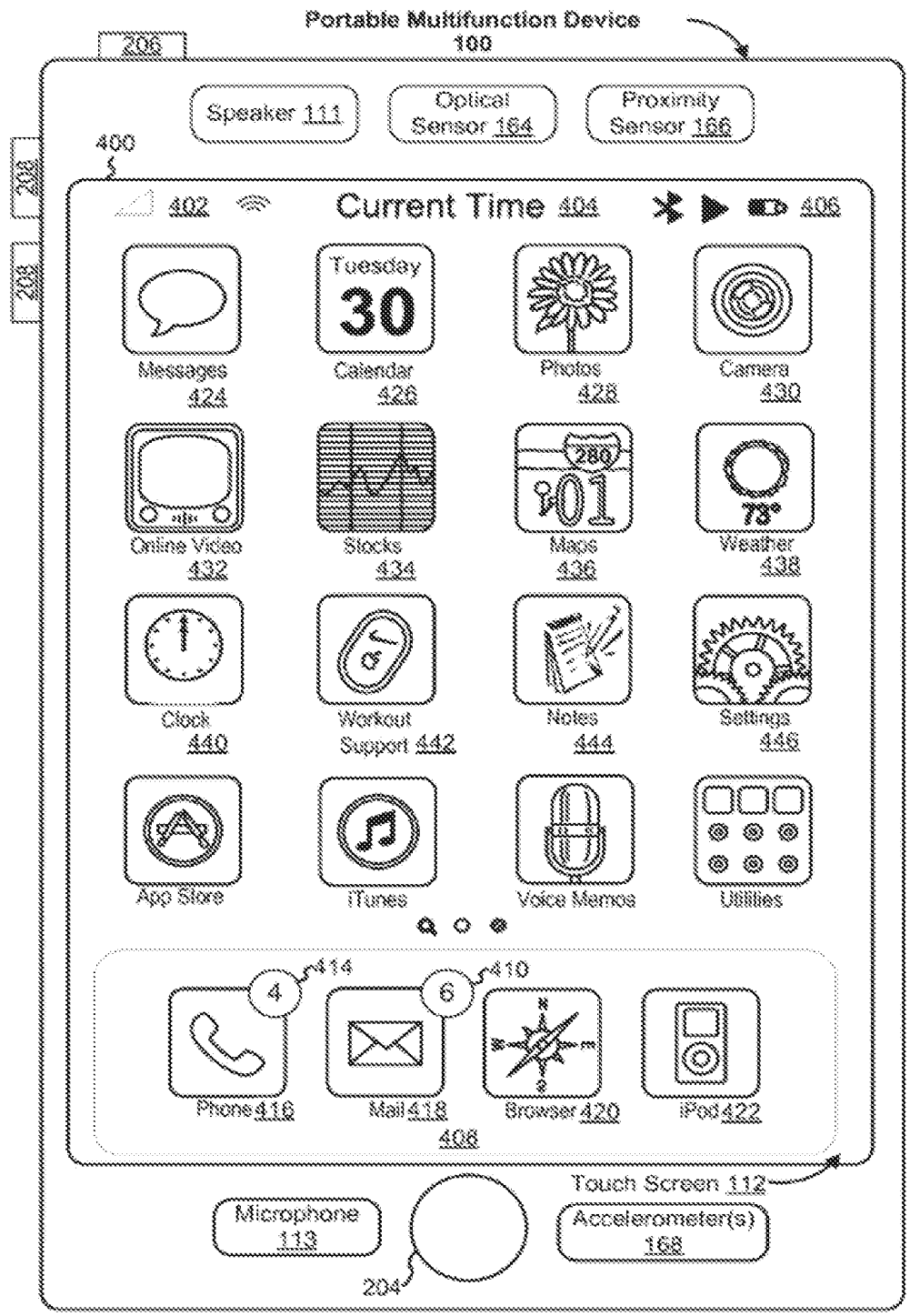
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for email client module 140, labeled "Mail," which optionally includes an indicator 410 of the number of unread e-mails;
  Icon 420 for browser module 147, labeled "Browser"; and
  Icon 422 for video and music player module 152, also referred to as iPod (trademark of Apple Inc.) module 152, labeled "iPod"; and
Icons for other applications, such as:
  Icon 424 for IM module 141, labeled "Text";
  Icon 426 for calendar module 148, labeled "Calendar";
  Icon 428 for image management module 144, labeled "Photos";
  Icon 430 for camera module 143, labeled "Camera";
  Icon 432 for online video module 155, labeled "Online Video"
  Icon 434 for stocks widget 149-2, labeled "Stocks";
  Icon 436 for map module 154, labeled "Map";
  Icon 438 for weather widget 149-1, labeled "Weather";
  Icon 440 for alarm clock widget 149-4, labeled "Clock";
  Icon 442 for workout support module 142, labeled "Workout Support";
  Icon 444 for notes module 153, labeled "Notes"; and
  Icon 446 for a settings application or module, which provides access to settings for device 100 and its various applications 136.

It should be noted that the icon labels illustrated in FIG. 4A are merely exemplary. For example, icon 422 for video and music player module 152 are labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
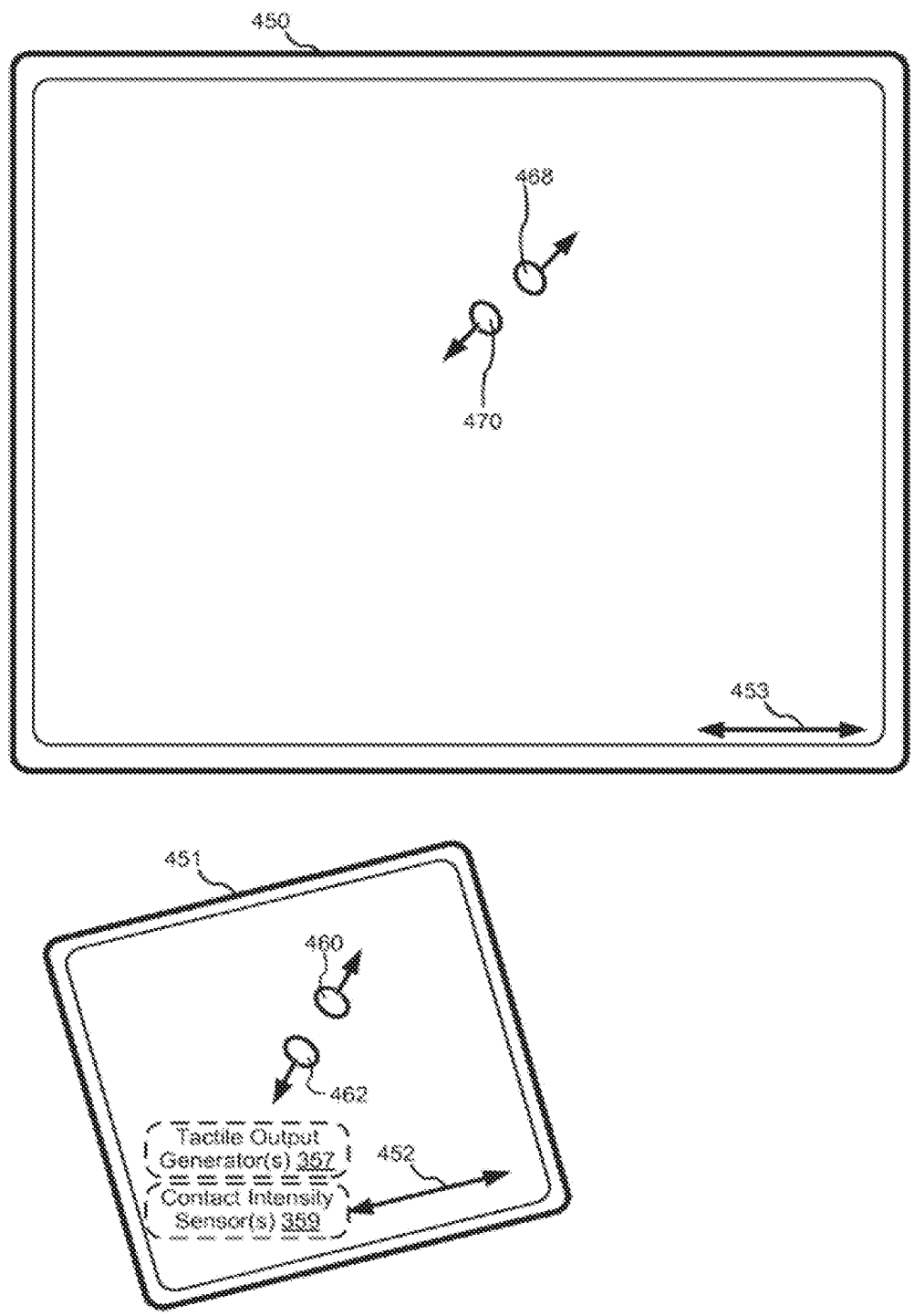
FIG. 4B illustrates an exemplary user interface for a multifunction device with a touch-sensitive surface that is separate from the display in accordance with some embodiments.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359 for detecting intensity of contacts on touch-sensitive surface 451 and/or one or more tactile output generators 357 for generating tactile outputs for a user of device 300.

Although some of the examples which follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments the touch sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or touch screen 112 in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

Attention is now directed towards embodiments of user interfaces ("UI") and associated processes that may be implemented on an electronic device with a display and a touch-sensitive surface, such as device 300 or portable multifunction device 100.

As mentioned previously, the device 100 includes multiple applications 136 configured to execute on the device 100. One of the multiple applications 136 is the email client module 140 and a user can interact with the application on the computing device 100. As will be further described below, the email client module 140 has various user interfaces to enhance the user experience with the computing device 100 when using the application.

Figure 5:
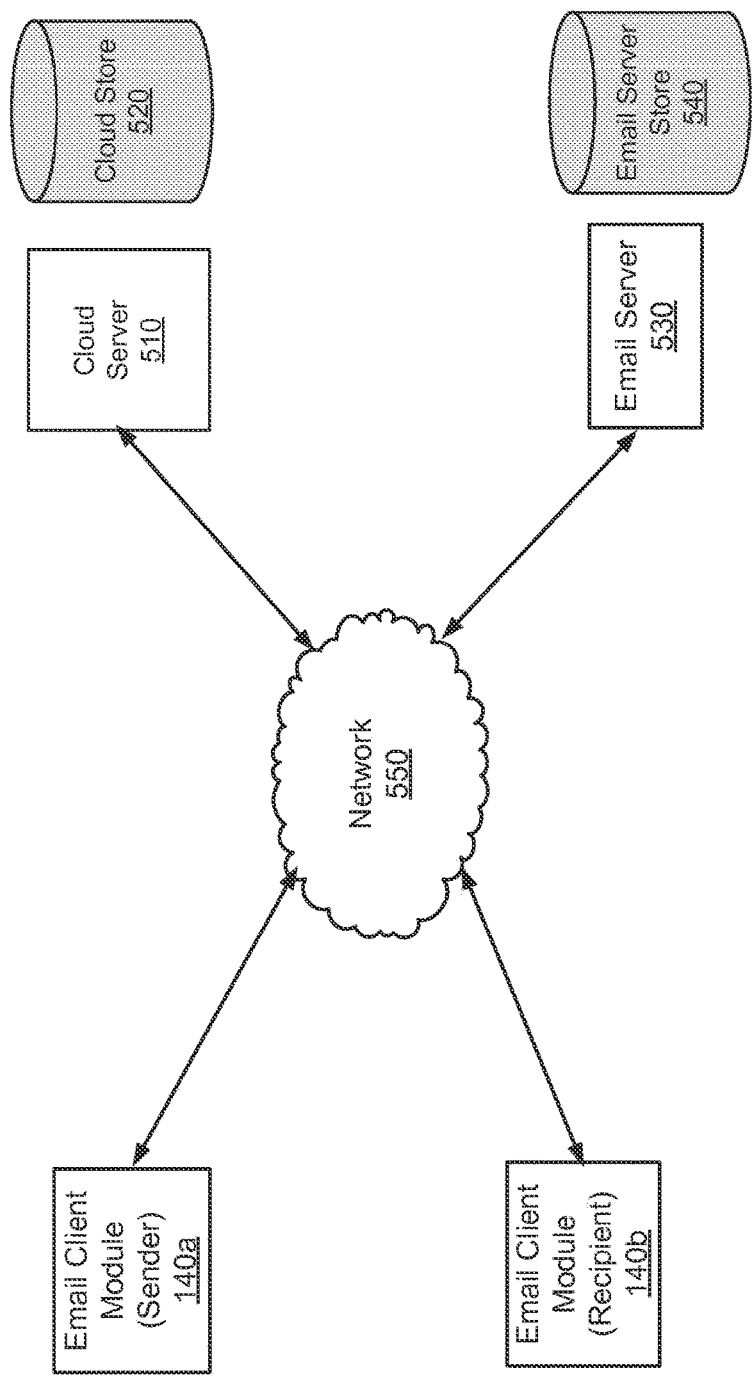
FIG. 5 illustrates a network diagram of devices and servers used for sending email messages with large attachments, according to one embodiment.

FIG. 5 is a block diagram illustrating an email system environment suitable for sending email messages among a plurality of email client modules 140. The email system environment comprises a plurality of devices 100, each running an email client module 140a and 140b, a cloud server 510, a cloud store 520 connected to cloud server 510, an email server 530, an email server store 540 connected to the email server 530, and a network 550. The devices 100 are configured to communicate via the network as described in detail above. In one embodiment, a server provides the services of the cloud server and email server. In alternative configurations, different and/or additional modules can be included in the system.

Email Application UI and Gestures

Figure 6:
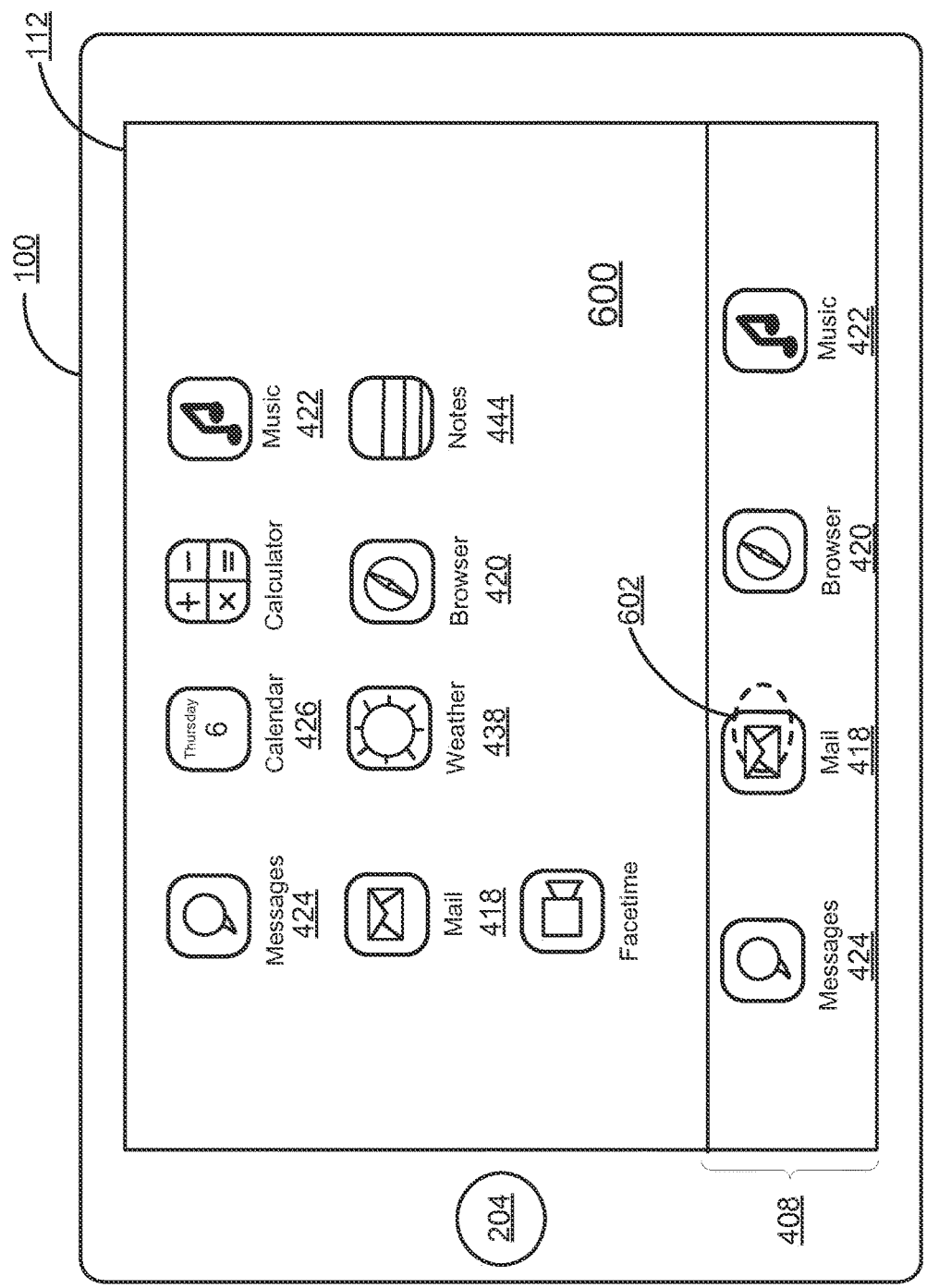
FIG. 6 illustrates a landscape view of icons for applications of the device, according to one embodiment.

FIG. 6 illustrates a landscape view of icons for applications of the device 100, according to one embodiment. For example, the tray 408 icons are for the following applications or modules:
 Icon 424 for IM module 141, labeled "Messages";
 Icon 418 for email client module 140, labeled "Mail," which optionally includes an indicator 410 of the number of unread emails;
 Icon 420 for browser module 147, labeled "Browser"; and
 Icon 422 for video and music player module 152, labeled "music"; and
Icons for other applications include:
 Icon 424 for IM module 141, labeled "Messages";
 Icon 426 for calendar module 148, labeled "Calendar";
 Icon 422 for video and music player module 152, labeled "music";
 Icon 418 for email client module 140, labeled "Mail," which optionally includes an indicator 410 of the number of unread emails;
 Icon 438 for weather widget 149-1, labeled "Weather";
 Icon 420 for browser module 147, labeled "Browser"; and
 Icon 444 for notes module 153, labeled "Notes."
In other embodiments, different and/or additional icons can be presented on the user interface 500.

Furthermore FIG. 6 illustrates a received gesture to execute ("launch") an application. The launch gesture is directed towards the "Mail" icon 418 indicative of a user request to execute the email client module 140a represented by the "Mail" icon 418. Although the launch gesture is described with respect to the portrait view of the icons, the launch gesture may also be received in a landscape view of the icons.

In one embodiment, the launch gesture or any other suitable gesture herein includes a contact on an icon. In general, a gesture is considered to be "on" an icon if the contact touches at least a portion of the icon displayed on the user interface 600. In FIG. 6, the launch gesture is represented by the contact 602 (e.g., of the user's finger, a stylus, or pointer device) on the "Mail" icon 418. In response to the launch gesture, the device 100 dismisses (i.e., removes) the icons from display on the user interface 600 and displays an application view 704 of a mail application corresponding to the "Mail" icon 418 as shown in FIG. 6. The application view 704 of the email client module 140 is shown in the user interface. The application view 704 of the "Mail" icon 418 includes emails from the user's email account(s).

Responsive to user selection of the menu button 204, for example, through contact of the menu button 204, the device 100 dismisses the application view 704 of the "Mail" icon 418 from the user interface 600 and displays the icons as shown in FIG. 6. In one embodiment, dismissal of an application merely removes the application 704 from being displayed on the user interface 600. The dismissed application is still executing in a background process of the device 100 even though the application view 704 of the application is no longer displayed on the user interface. Thus, the email client module 140 shown in FIGS. 3 and 5 is still executing in the background of the device 100 even though the application view 704 of the email client module 140 has been dismissed.

Figure 7:
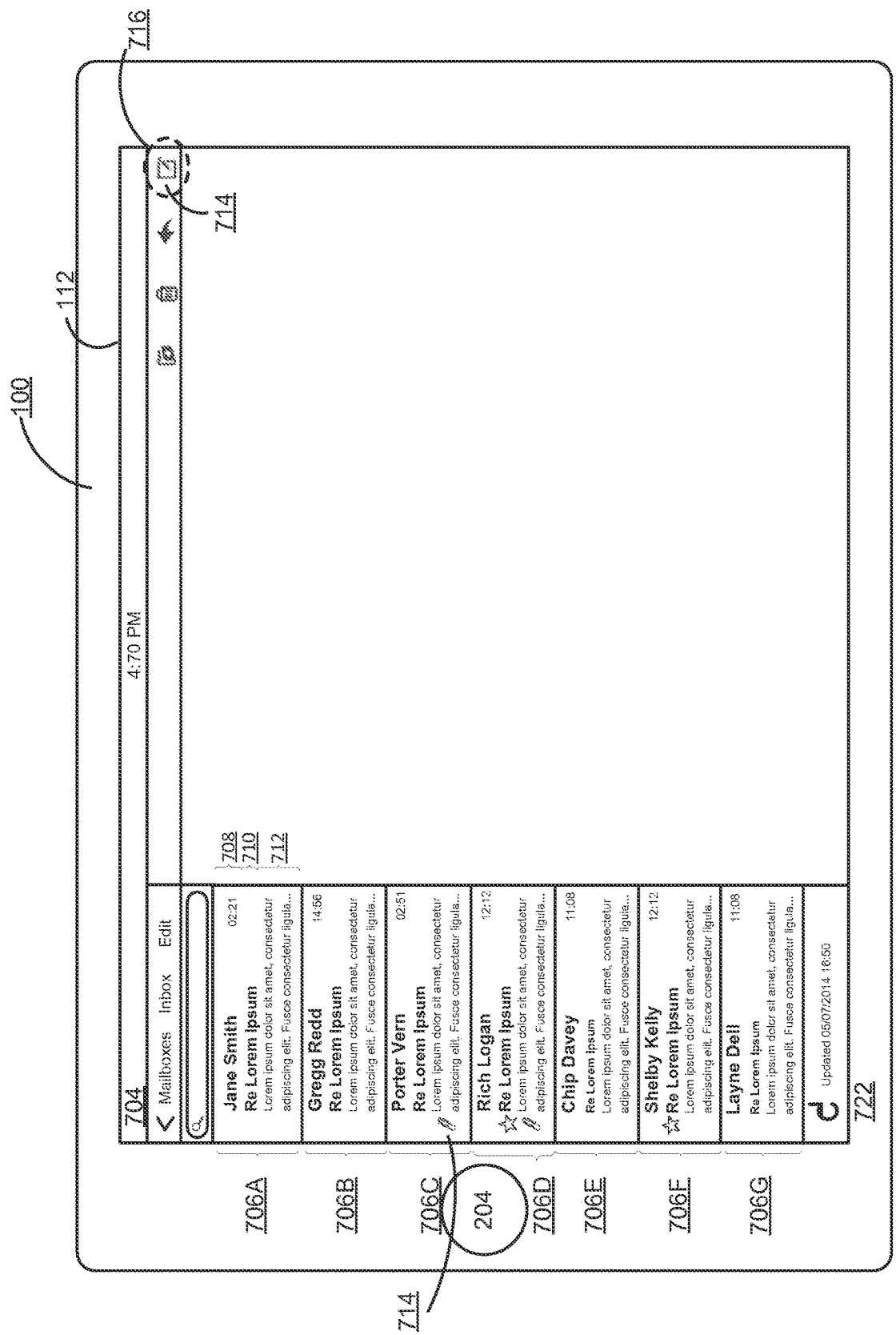
FIG. 7 illustrates an application view of an email application, according to one embodiment.

FIG. 7 illustrates an application view 704 of an email application, according to one embodiment. For example, the application view 704 displays email messages 706A, 706B, 706C, 706D, 706E, 706F and 706G from the inbox of the user's email account. Each email message 706 displays sender information 708, subject information 710, a portion of the body of the email 712, and optionally other indicators, such as an attachment indicator 714. As also described in FIG. 7, additional user interface elements are displayed in the application view 704 and among others a new draft element 714.

Figure 8A:
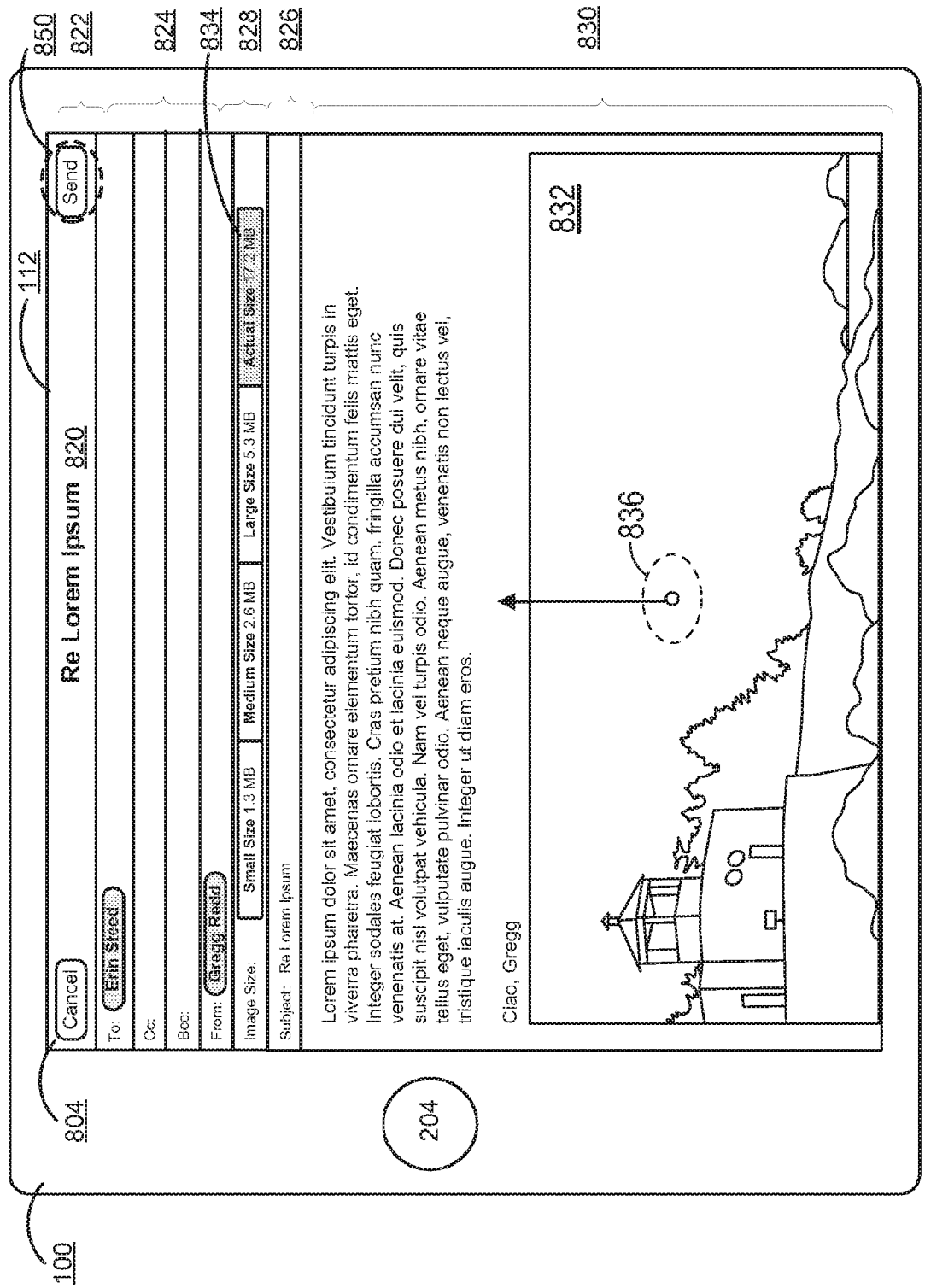

FIG. 7 also illustrates a draft gesture 716 indicative of a request to draft a new email and open a composition interface. For example, the draft gesture is a contact 716 detected by the device 100 on the new draft element 714. Responsive to the detected contact 716, a message composition interface or draft user interface (UI) 820 is shown in the application view 804 as illustrated in FIG. 8A, according to one embodiment. A draft UI 820 of the email application also can be opened by other another application module that invokes the email client module 140 to compose an email message. In yet other examples, the email application opens a draft UI 820 in the application view 804 when the user replies to or forwards an email message received through the email application. A person skilled in the art can readily appreciate that a draft UI 820 can be open by a user in other ways through the email application.

Figure 8B:
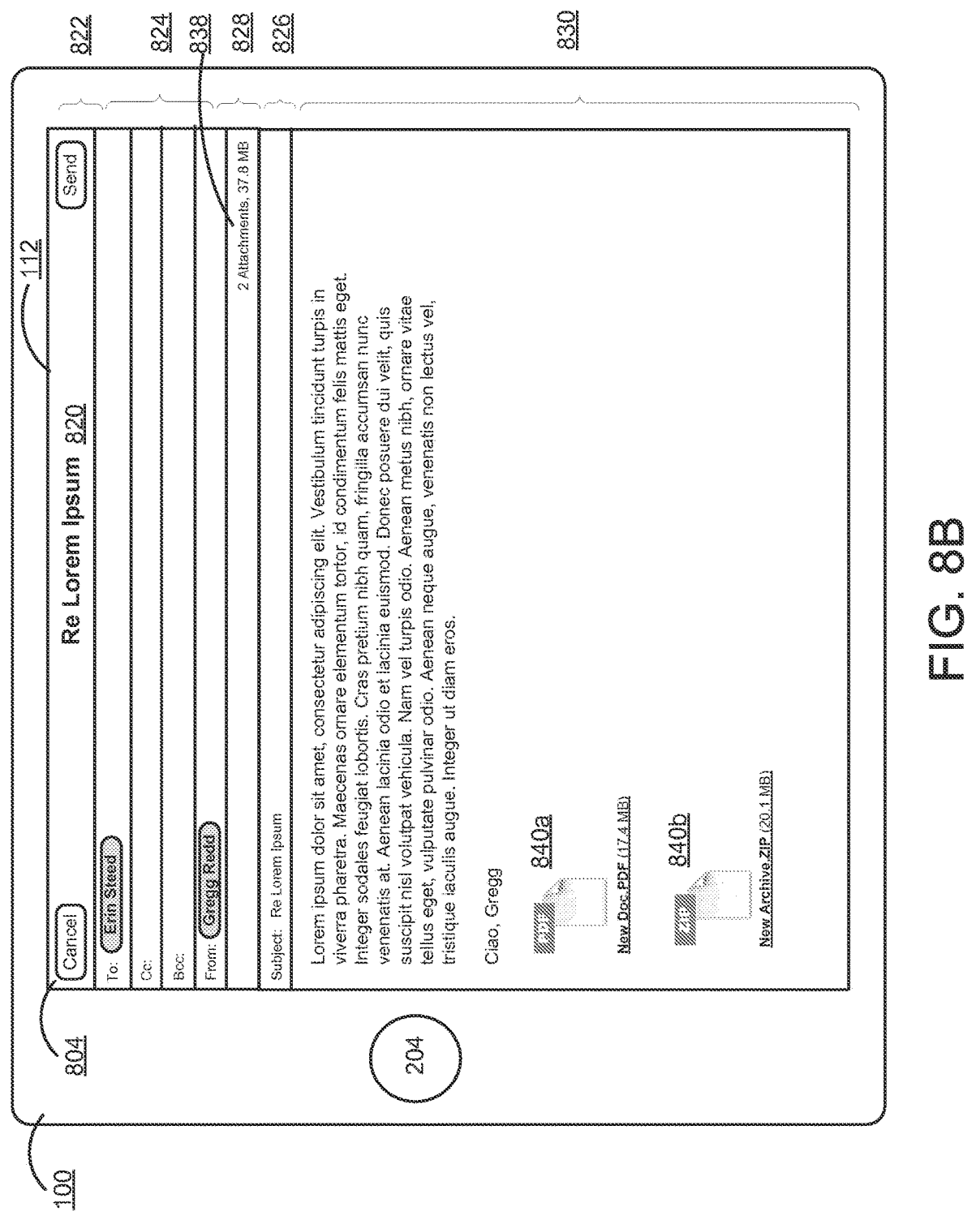
Figure 9:
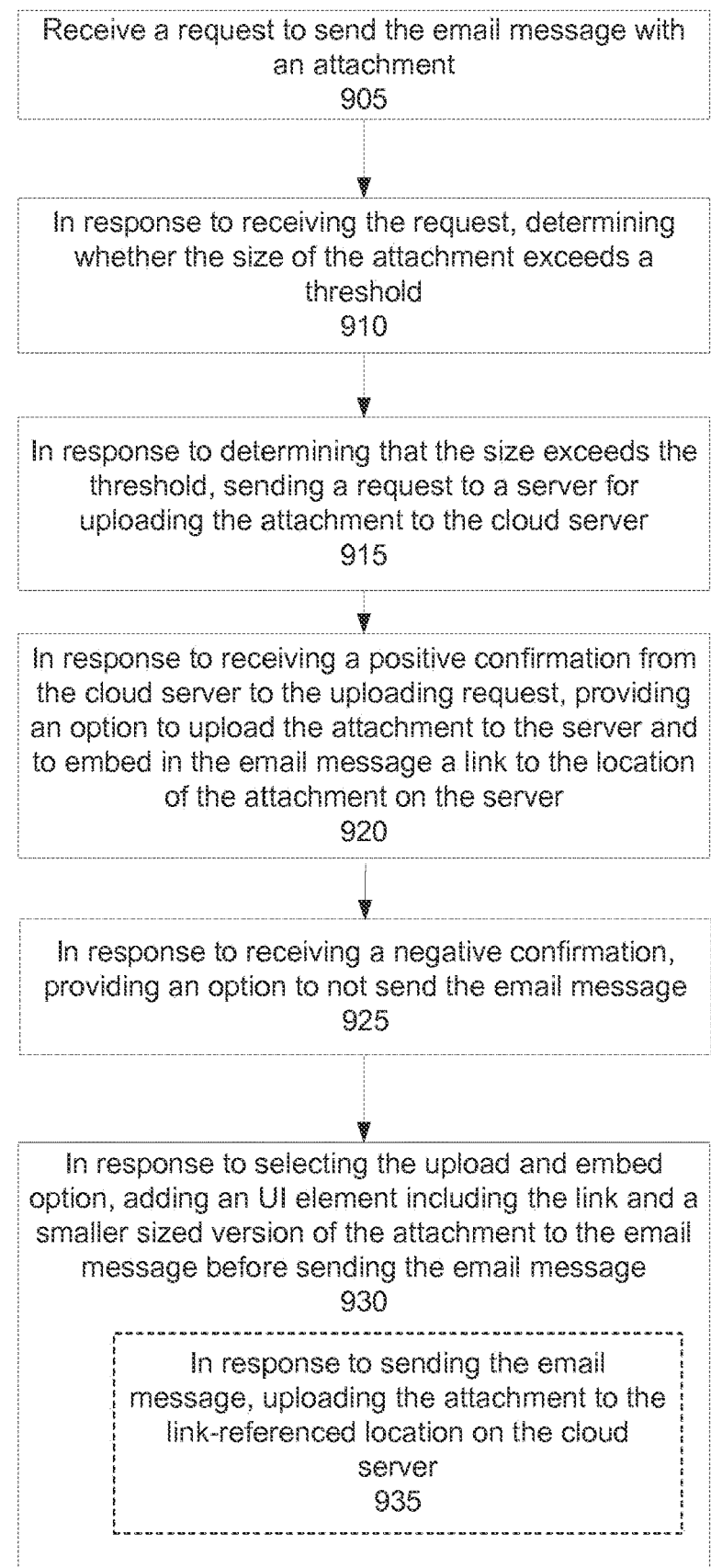
FIG. 9 illustrates a flowchart for sending a message including a large attachment, according to one embodiment.

As described further in conjunction with FIG. 9, a method is described herein of replacing an attachment in an email that is above a threshold size with a link to the attachment on a server. Often an email server imposes a limit on the size of an email message (including any attachments) that it accepts from a sender's email client module. If an email message size exceeds that limit, the email server rejects ("bounces") the email message, without storing a copy for later retrieval by the recipient. To avoid testing an email server's size limit and risking that an email messages bounces, the email client module provides the user with the option of sending the email message and attachment separately, using the cloud server 510 for sending the attachment and the email server 530 for sending the email message minus the attachment. This method allows a user to send via email attachments that typically are too large to be sent due to size limits enforced by outgoing and/or incoming email servers. FIG. 8A corresponds to image email attachments, whereas FIG. 8B corresponds to PDFs or other types of email attachments.

FIG. 8A illustrates a draft UI 820 in the application view 804 of the email application for sending a message with an attachment, according to one embodiment. The draft UI 820 includes a header element 822, a sender information element 824, a subject information element 826, an image size selection element 828, and a message body element 830. The header element 822 dudes cancel and send buttons, and optionally the subject of the message or a "New Message" indicator. In the sender information element 824 the user can enter address information to allow delivery of the email message to the specified recipient. In one embodiment, the sender information element includes an input element to enter a character string associated with the address information of the recipient. The input element invokes the text input module 134 for inputting the text string. The sender information can include the name of the sender, e.g. the sender's first or last name, and additional recipients (carbon-copied or blind carbon-copied) of the email messages. As illustrated in FIG. 8A the corresponding input elements of sender information are indicated by "To:," "From:," "Cc:," or "Bcc"; labels. The subject information element also includes an input element to enter a subject for the composed email message.

The draft UI 820 contains an additional input field for the message body 830. This input field allows the user to compose text for the email message of the email application. Furthermore, the user may include attachments with the email message of the email application. An attachment may contain various content units such as, photos, audio files, video files, text files, archive files, and portable document files among others. An attachment may be included in an email message, for example, when another application (described above) that runs on the device invokes the email application to send a content unit to an email recipient with an email message.

The embodiment of FIG. 8A illustrates the case of one or more images (e.g., photos) being attached to an email messages in the draft UI 820. In addition to the images the user attaches to the email, low resolution images 832 are embedded in the body of the email message according to the displayed embodiment. In other embodiments, the decision whether to embed low resolution images occurs after the system determines that the image attachments exceed the maximum size. The image size selection element 828 allows the user to select the size of each attached image through a selection gesture. The selection gesture is a contact with one of the size buttons 834 displayed in the image size selection element 828. A contact (not shown) on the size button 834, selects the size of each attached image. The selected size button is displayed visibly distinguished from the other non-selected size buttons, shown in FIG. 8A as a darker grey color. When selecting a size different from the actual size of the attached images, the image management module 144 resizes the attached photos to the selected size. In one embodiment, the selection includes a small size, a medium size, or a large size option in addition to the actual size of the images. The email client module 140 receives the newly resized images from the image management module 144 and attaches them to the email message. In one embodiment the image management module 144 calculates the total size of all resized images and communicates the total size to the email client module 140 that displays the size on the corresponding size button of the draft UI 820.

The body of the message 830 including additional low resolution images that are not initially visible in the application view 804 can be displayed following a scrolling gesture 836. This scrolling gesture is applied in a direction substantially perpendicular to the text lines of the displayed email messages, as shown in FIG. 8A. Applying this scrolling gesture displays body of the email message that follows the currently displayed message body. Reversing the direction of the scrolling gesture displays part of the message body that precedes the currently displayed part.

The embodiment of FIG. 8B illustrates the case of files that are not images being attached to an email messages in the draft UI 820. In this embodiment, a portable document file (New Doc.PDF) and archive file (New Archive.ZIP) are attached to the composed email message shown in the application view 804. Instead of the image size selection element, an attachment information element 838 is displayed that provides information about the attached files, e.g. the size and number of attached files. In addition to the information element 838, the draft UI 820 displays an attachment element 840 for each attachment in the body of the email message. The display of the attachment element 840 may include, but is not limited to an icon indicative of the type and format of each attached file, their names and sizes, and a link pointing to their cached location accessible by the email client module.

FIG. 9 illustrates a method of sending an email message by replacing an attachment with a link to a server storing the attachment according to one embodiment. Responsive to the contact 850, shown in FIG. 8A, on the send button detected by the device 100, the email client module 140 receives 905 a request to send the email message including the attachment to the recipient contained in the sender information. In response to receiving the request, the email client module 140 determines 910 the size of the email message including its attachment. In another embodiment, the email application run by the email client module only determines the size of the attachment. If the size exceeds a threshold, the email client module 140 sends 915 a request to a cloud server 510 for uploading (storing) the attachment to the server. In response to receiving the request from the module 140, the cloud server 510 determines whether the size of the attachment exceeds a threshold and if the size does not exceed the threshold, calculates the storage space at a location on the cloud server that is configured to store the attachment. The cloud server bases this calculation on various storage parameters, e.g. a storage limit of the user associated with the request. If the storage space is sufficient to store the attachment, the cloud server 510 sends a positive confirmation back to the email client module 140. The positive confirmation includes a link to the calculated location and validity information of the link. The validity information may include a date on which the storage space at the calculated locations expires and the attachment is no longer available for downloading from the cloud server.

In response to the email client module 140 receiving a positive confirmation from the server 510 to the uploading request, the email client module 140 provides 920 the user with an option to upload the attachment to the cloud server. The confirmation may include a reference to the location where on the server 510 the attachment is uploaded to. In one embodiment, the attachment is stored in the cloud store 520. If the confirmation from the server 510 is negative, e.g. the attachment size exceeds a threshold size available on or allowed by the server 510 or the storage limit on the server 510 is reached, the email client module 140 provides 925 the user with the option to cancel the delivery of the email massage. These options among other options are included in sheets 1010 of send options displayed in the application view 1004 of the email application, as illustrated in FIGS. 10A-D. In one embodiment, if the storage limit is reached, the server 510 sends an alert to the email client module 140 about reaching the limit.

Figure 10A:
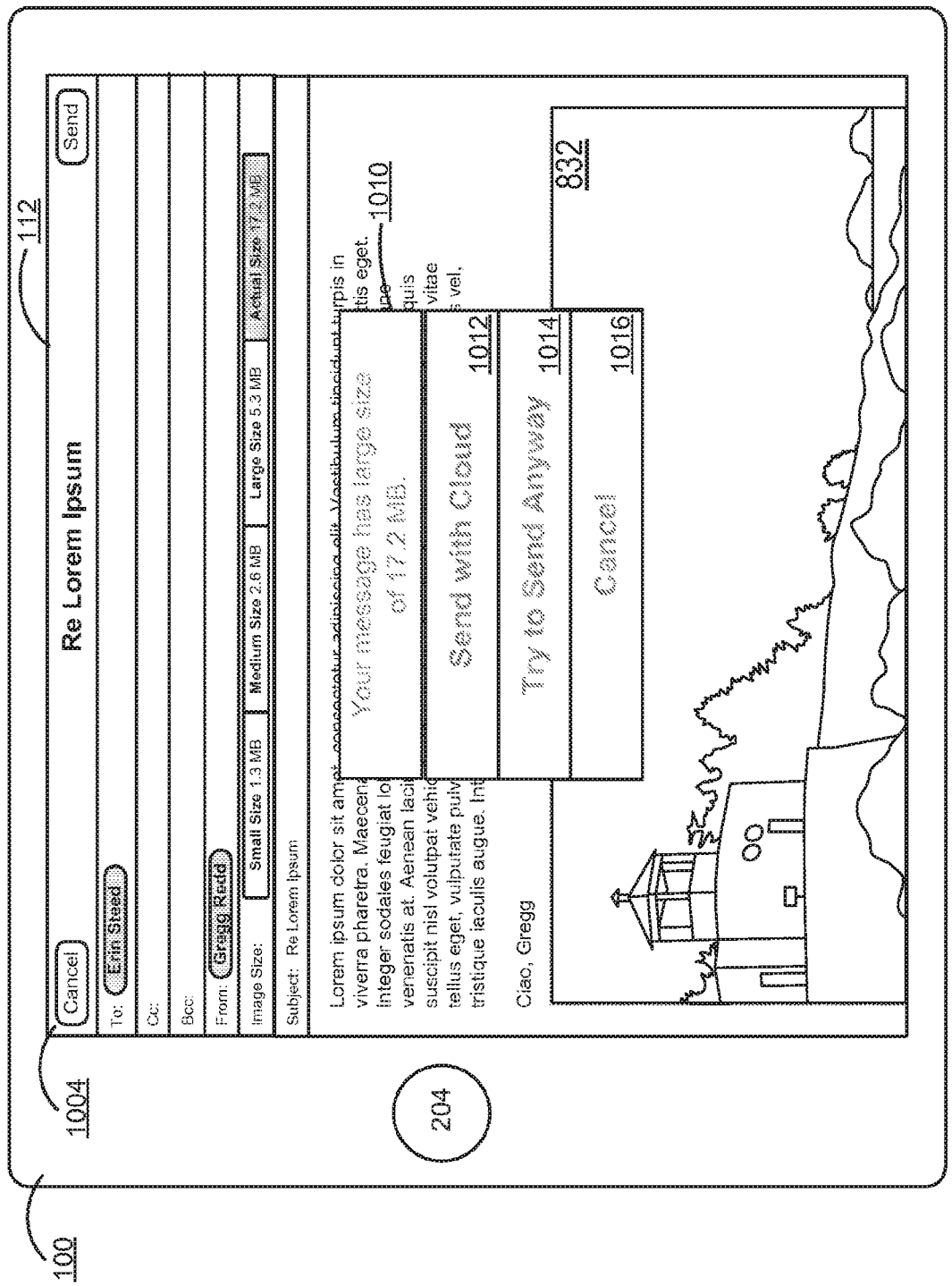
FIGS. 10A-10D illustrate send options in the email application, according to some embodiments.
Figure 10B:
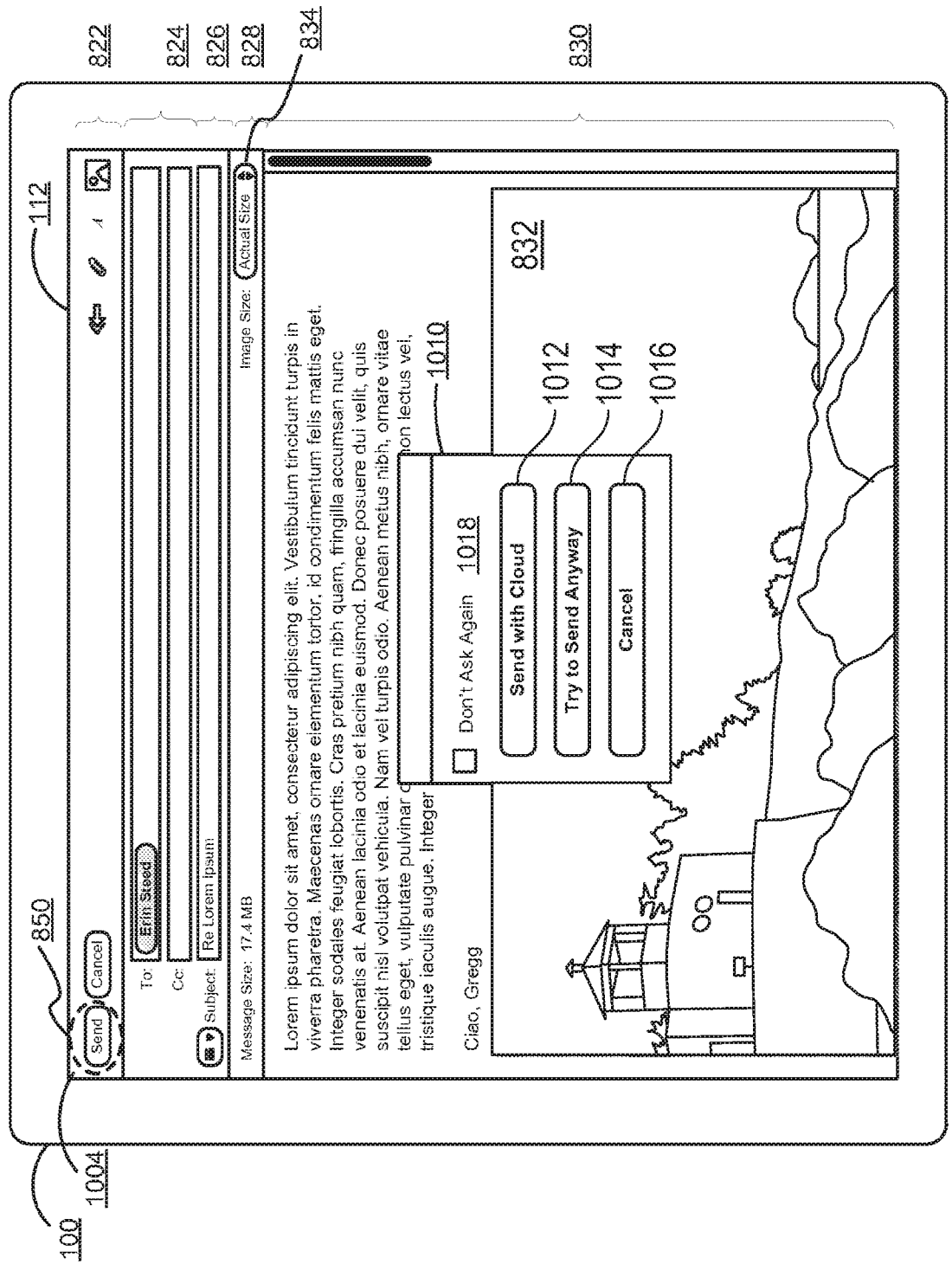

FIGS. 10A and 10B illustrate sheets 1010 of send options for sending the email message including the attachment(s) in the application view 1004 of the email application, according to one embodiment. The send options include "Send with Cloud" 1012, "Try to Send Anyway" 1014, and "Cancel" 1016. Responsive to the selection of the "Cancel" option 1016, the email application cancels the delivery of the email message to the specified recipient. One embodiment includes an option for the email client module 140 to save the previous user selection among the send option. As illustrated in FIG. 10B, the sheet 1010, for example, can include a check box "Don't Ask Again" 1018 that the user can select to store the current selection among the presented options 1012, 1014, and 1016 for application to future email messages. In response to a subsequent request for sending an email message, the email client module 140 will not provide the user with send options 1012, 1014, and 1016.

When selecting the option "Try to Send Anyway" 1014, the email client module 140 of the sender identifies the email server 530 associated with the recipient contained in the sender information of the email message. The email server 530 stores and forwards the email message including the attachment(s) to the recipient's email address. Upon identifying the email server 530, the sender's email client 140 sends the email message and attachment to the email server 530 that stores a copy of the message and attachment in the email server store 540. Upon the recipient's email client module 140 contacting the email server 530 for obtaining the email message, the email server 530 retrieves the messages with the attachment from the email server store 540 and transmits them to the recipient's email client module 140. Oftentimes, the email server imposes a limit on the size of an email messages (including any attachments) that it accepts from a sender's email client module. If the email message size exceeds that limit, the email server rejects ("bounces") the email message, without storing a copy for later retrieval by the recipient. In some cases, the email server sends a message to the sender's email client module informing it of the maximal size of an email message that the email server accepts. To avoid testing an email server's size limit and risking that an email messages bounces, the email client module provides the user with the option of sending the email message and attachment separately, using the cloud server 510 for sending the attachment and the email server 530 for sending the email message minus the attachment.

Figure 11A:
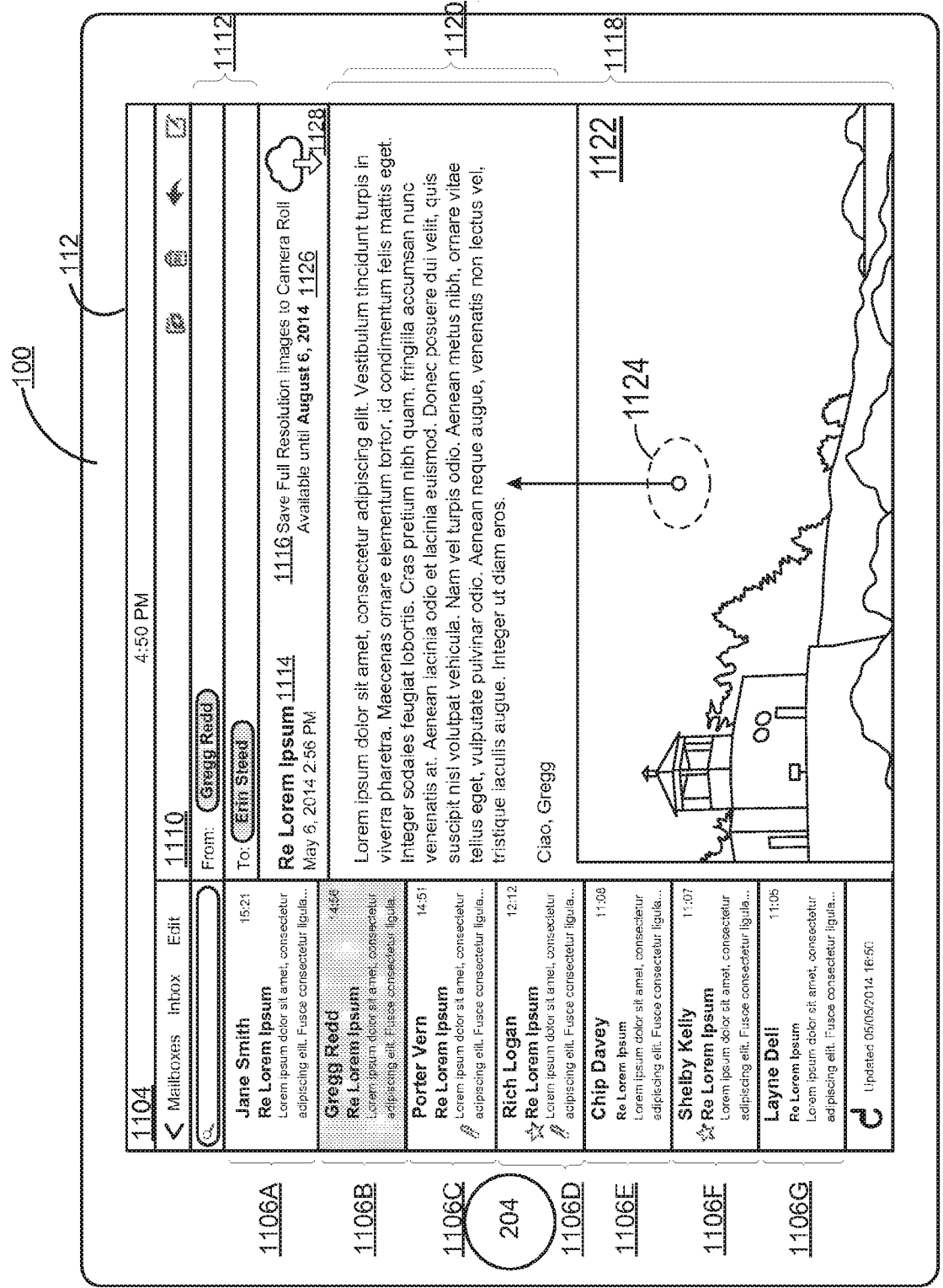

When selecting the option "Send with Cloud" 1012, the email client module 140 adds 930 in the email message a link to the location of the attachment on the cloud server 510 and an UI element to the email message before sending the message to the email server 530. The email client module 140 may retrieve a reference for the location from the cloud server's confirmation message. Alternatively, the email client module 140 may query the cloud server 510 for the reference or receive the reference from the cloud server after uploading the attachment to the server. In one embodiment, a version of the attachment also is embedded in the email message before sending the email message to the email server 530. This version may include, but is not limited to, a different format of the attachment and a smaller-sized version of the attachment, e.g. a low resolution image of an attached photo. When the email message is displayed at the recipient, the embedded version of the attachment 1122 is visibly displayed within the body of the message in addition to the UI element that includes a link 1128 to the location of the attachment on the cloud server 510, as shown in FIG. 11A.

Furthermore, when selecting the option "Send with Cloud" 1012, the email client module sends the email message with the embedded link and UI element to the email server 530. In response to sending the email message, the email client module 140 uploads 935 the attachment to a location on the cloud server referenced by the link in the email message.

Figure 10C:
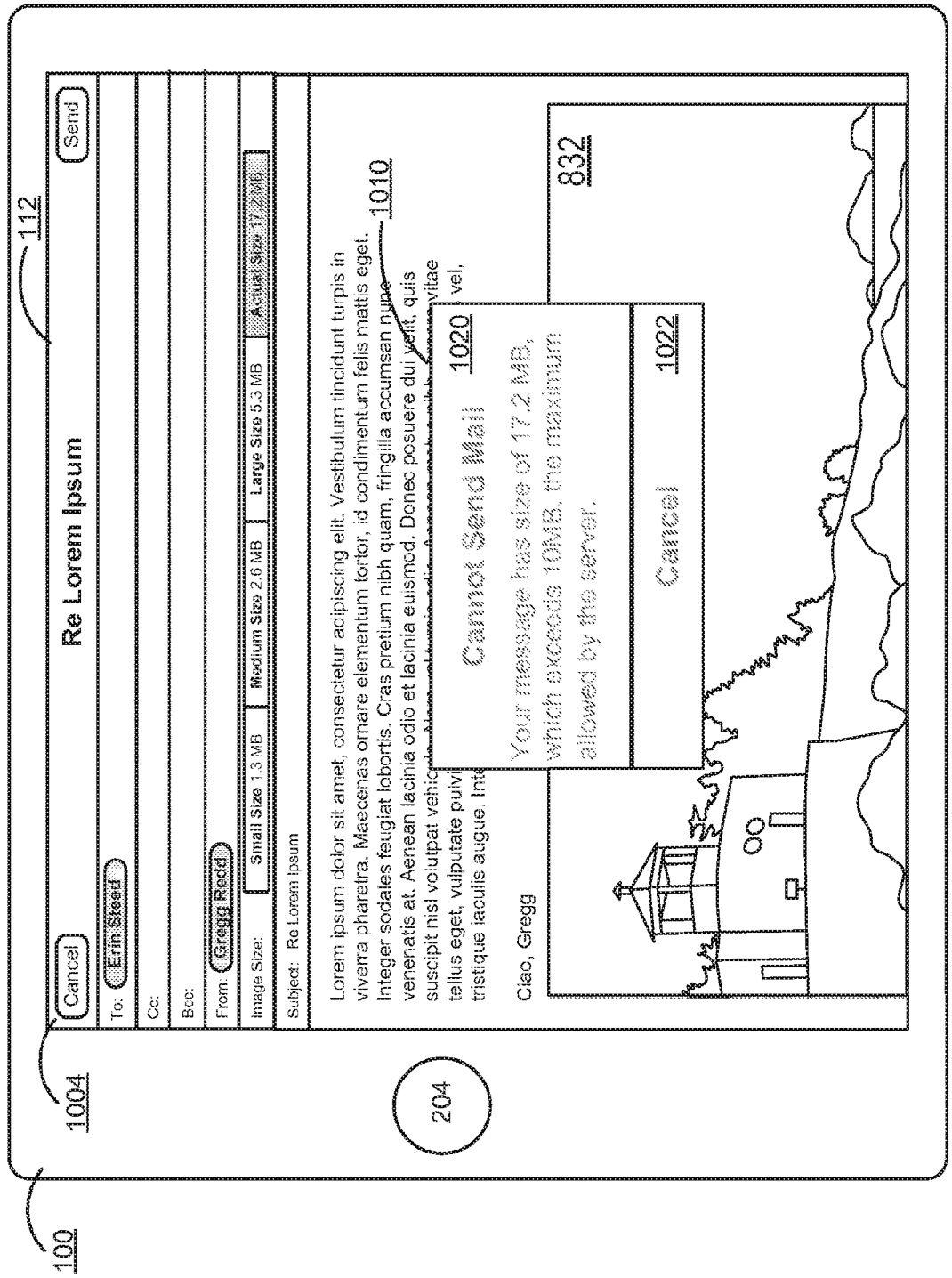
Figure 10D:
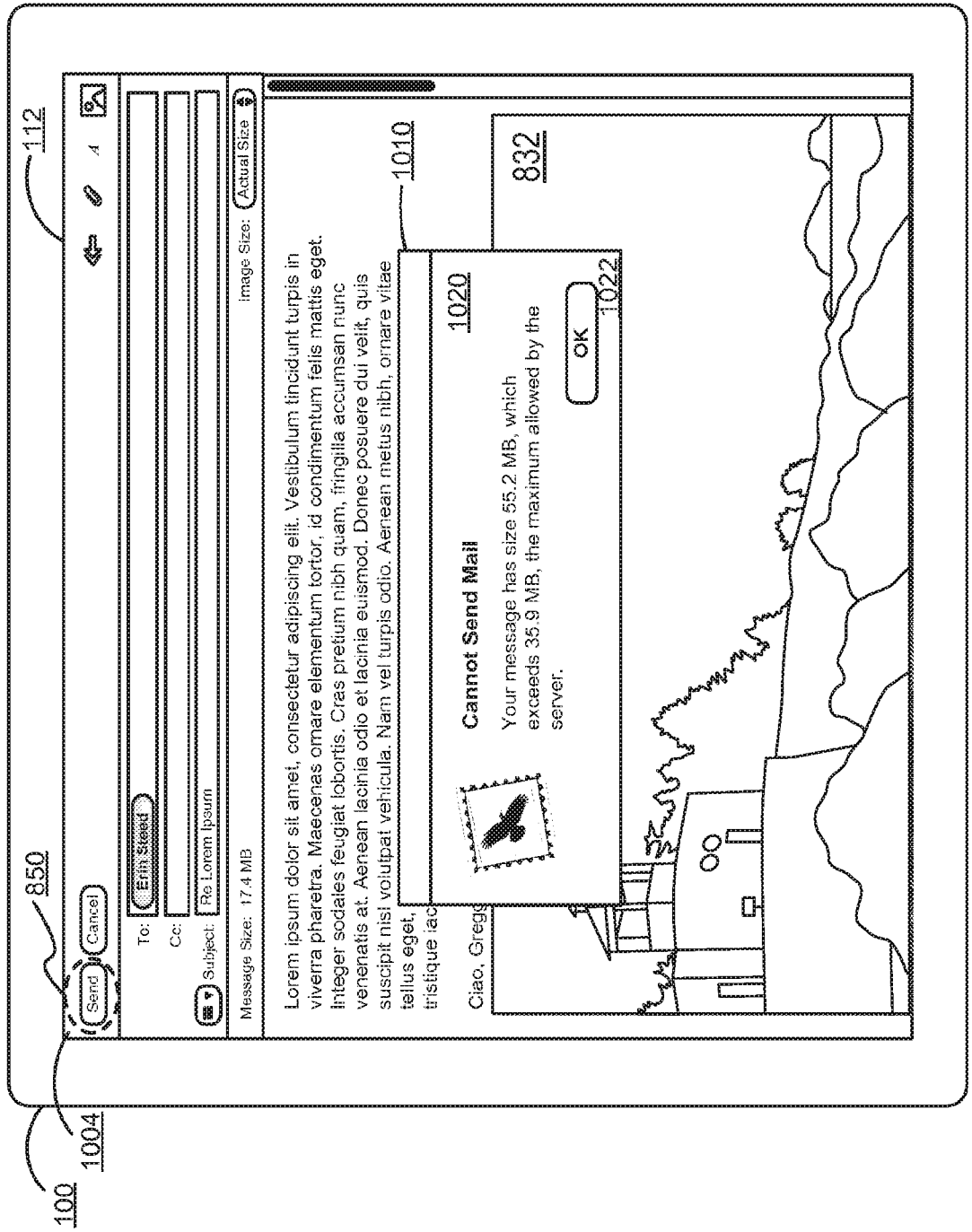

FIGS. 10C and 10D also illustrates sheets 1010 of send options for sending an attachment using a cloud server 510 when the attachment size exceeds a threshold value provided by the cloud server, according to one embodiment. In this embodiment, the email client module 140 receives a negative confirmation from the cloud server 510 for uploading the attachment, indicating that the size of the attachment exceeds an allowed threshold value. Alternatively, the email client module 140 determines that the size of the attachment exceeds a specified threshold value for the cloud server 510. A "Cancel" button 1022 (FIG. 10C) or "Ok" button 1022 (FIG. 10D) is displayed with a message 1020 alerting the user of the size of the attachment and the maximum size allowed by the cloud server 510 for sending the attachment, e.g. "Your message has size of 17.2 MB, which exceeds 10 MB, the maximum allowed by the server." Responsive to the selection of the Cancel option 1022, the email application run by the email client module 140 cancels the delivery of the email message to the specified recipient of the email message. However, to send such a message one may use the image size selection element 834 to select a different attachment size that falls below the threshold value.

Upon a recipient's email client module 140 requesting an email message addressed to the recipient from the email server 530, the email client module 140 receives this email message from email server 530 and displays the received email message to user. In one embodiment, the email client module receives an email message that comprises a link to a location of an attachment on a cloud server 510, which is associated with the email message, and validity information of the link. In this embodiment, the email message without the attachment is stored in the email server store 540 associated with the email server 530, and upon request by the email client module 140 is retrieved from store 540 and transmitted to the module 140 by the server 530. In response to an action to open the email message with the link by the email client module 140, the module determines whether the link is valid using the validity information. Furthermore, in response to an action that selects the link to the location of the attachment, i.e. download gestures in FIGS. 11B-D, and if the link is valid, the module 140 sends a request to the cloud server 510 to retrieve the attachment. The module 140 proceeds to retrieve the attachment from the server. In response to the retrieval the module 140 updates validity information, including its visible indication, of the link to indicate that the attachment has been retrieved from the cloud server. In one embodiment, the email client module stores the email message with the updated validity information and with the attachment being embedded within the email message on a specified location associated with the device 100.

Figure 11B:
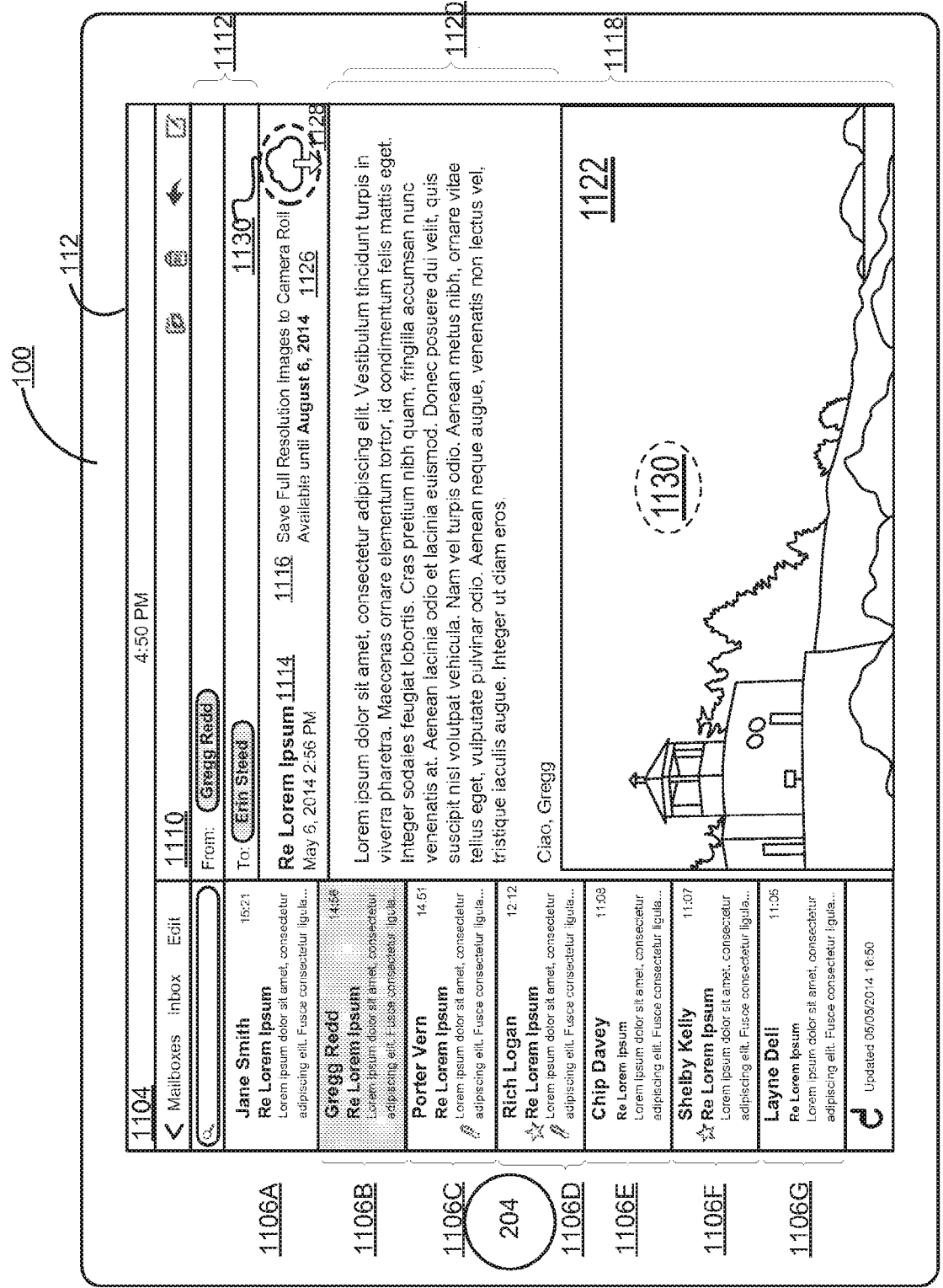
Figure 11C:
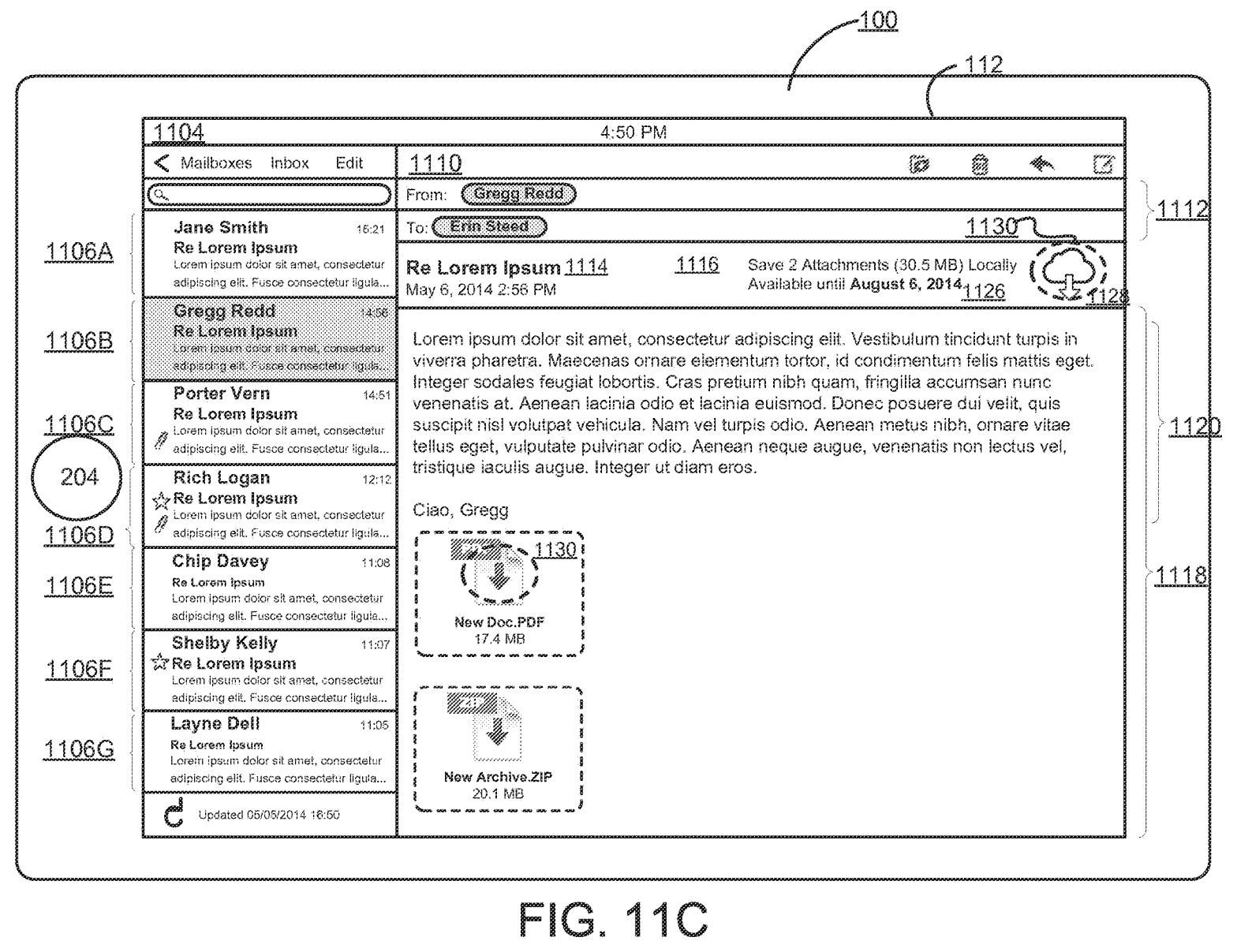

FIGS. 11A-11C illustrates an application view 1104 of an email application displaying email messages including attachments, where the attachments send through a cloud server 510, according to one embodiment. As illustrated in FIG. 11A, the application view 1104 displays a message section 1110 in addition to the email messages 1106A, 1106B 1106C, 1106D, 1106E, 1106F and 1106G from an inbox of the user's email account. The email messages 1106B displayed in the message section 1110 may include sender information 1112, subject information 1114, attachment information 1116, and a portion of the message body 1118 of the email 1106B. The displayed portion of the message body 1118 shows a message text 1120 and an embedded version of the attachment 1122 that is a low resolution image. Part of the message body 1118 that is not initially displayed in the application view 1104 can be displayed following a scrolling gesture 1124. This scrolling gesture 1124 is applied in a direction substantially perpendicular to the text lines of the displayed text message, as shown in FIG. 11A. Applying this scrolling gesture displays other non-displayed portion of the email message 1106B in the message section 1110, for example the remaining part of the displayed low resolution image and any other inline embedded low resolution images included in the attachment. Once other portions of the email message 1106B are displayed in the message section 1110 reversing the direction of the scrolling gesture displays the portion of the message that precedes the currently displayed portion.

The attachment information 1116 includes the UI element 1126 that includes a link to the location of the attachment(s) on the cloud server 510. The displayed UI element 1126 shows the expiration date of the link and UI download element 1128 that is indicative of the download status of the attachment from the cloud server. The expiration date is the date starting on which the cloud server will refuse any request from the email client module for downloading the attachment. The UI download element 1128 indicates the status of attachment on the cloud server 510, for example whether the attachment is still available for downloading, whether the attachment has previously been downloaded, whether the link has expired, or during downloading what percentage of the attachment has received by the email client module. As illustrated in FIG. 11A, the UI download element 1128 indicates the attachment is still available for downloading and that the link has not expired. In one embodiment, the attachment information 1116 includes information regarding the download destination and the type of attachment. The download destination is the location at which the client email module 140 stores the downloaded attachment, for example the "Camera Roll."

Figure 11D:
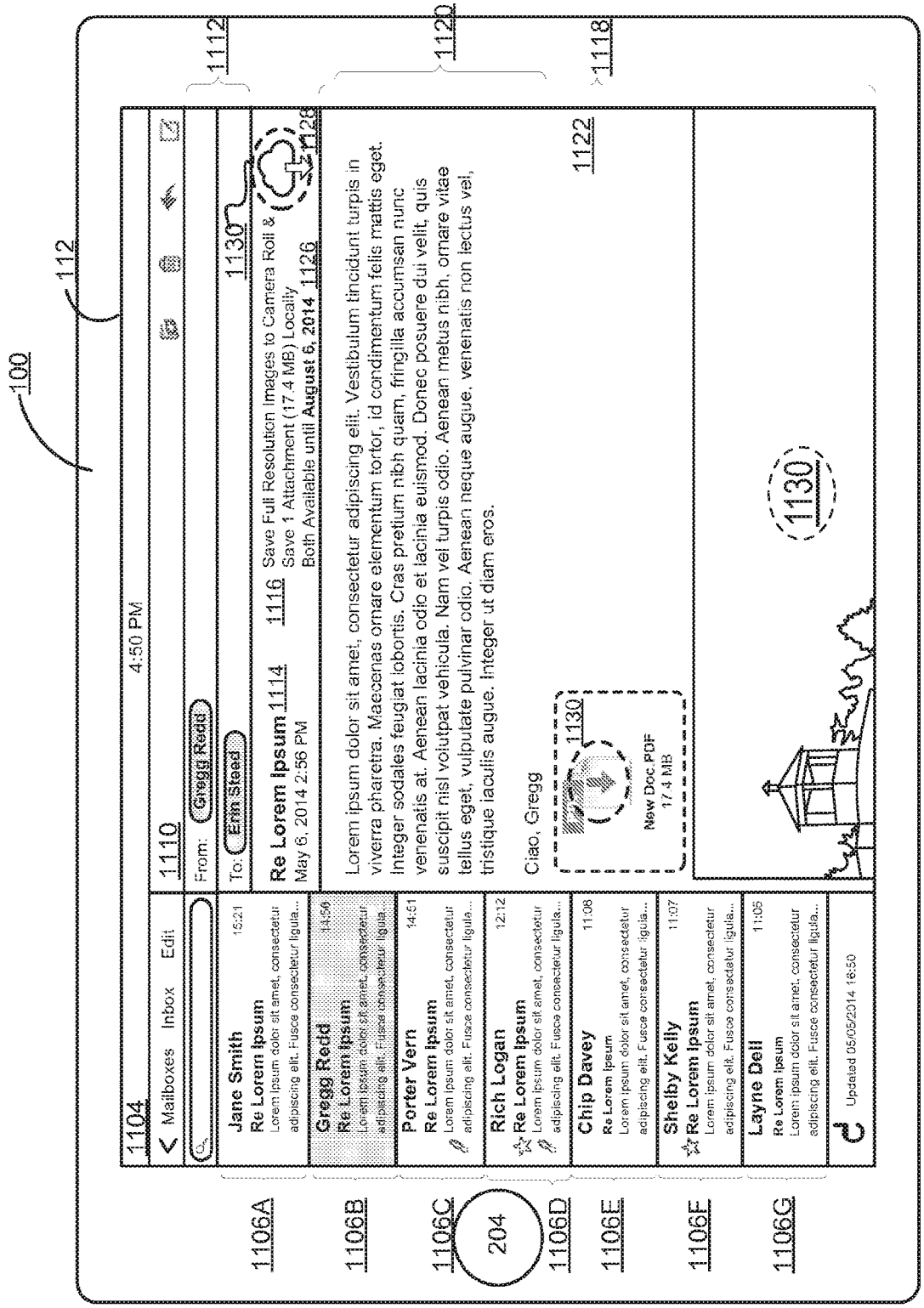

FIG. 11B-11D illustrates a download gesture in the application view 504 associated with the message section 1110, according to some embodiments. The download gesture is executed by a contact 1130a on the UI download element 1128 as shown in FIG. 11B. In another embodiment, the contact 1130b be on an embedded version of the attachment, e.g. a low resolution image, as shown in FIG. 11B. FIGS. 11C and 11D illustrate additional download gestures including contact 1130, when the attachment to be retrieved from the cloud server 510 includes files other than images, e.g. a portable document file or archive files, or a mixture of file types.

Responsive to the download gesture with contact 1110 detected by the device 100, the email client module 140 sends a request to the cloud server 510 to retrieve the attachment by de referencing the link to the location of the attachment on the cloud server. The email client module then retrieves the attachment from the cloud server 510, unless the expiration date 1126 for attachment has expired. In response to retrieving the attachment, the email client module updates the validity information of the link to indicate that the attachment has been retrieved from the cloud server, according to one embodiment. Alternatively, if the attachment consists of only photos, the updated validity information indicates that the attachment is still available for downloading from the cloud server, unless the expiration date has expired. Upon successfully downloading the attachment the email client module 140 stores the updated validity information and the attachment at locations provided by the module 140. Furthermore, the email client module 140 stores the email message associated with the downloaded attachment. When storing the email message the module 140 stores the attachment by embedding the attachment inline the stored email message.

Figure 12:
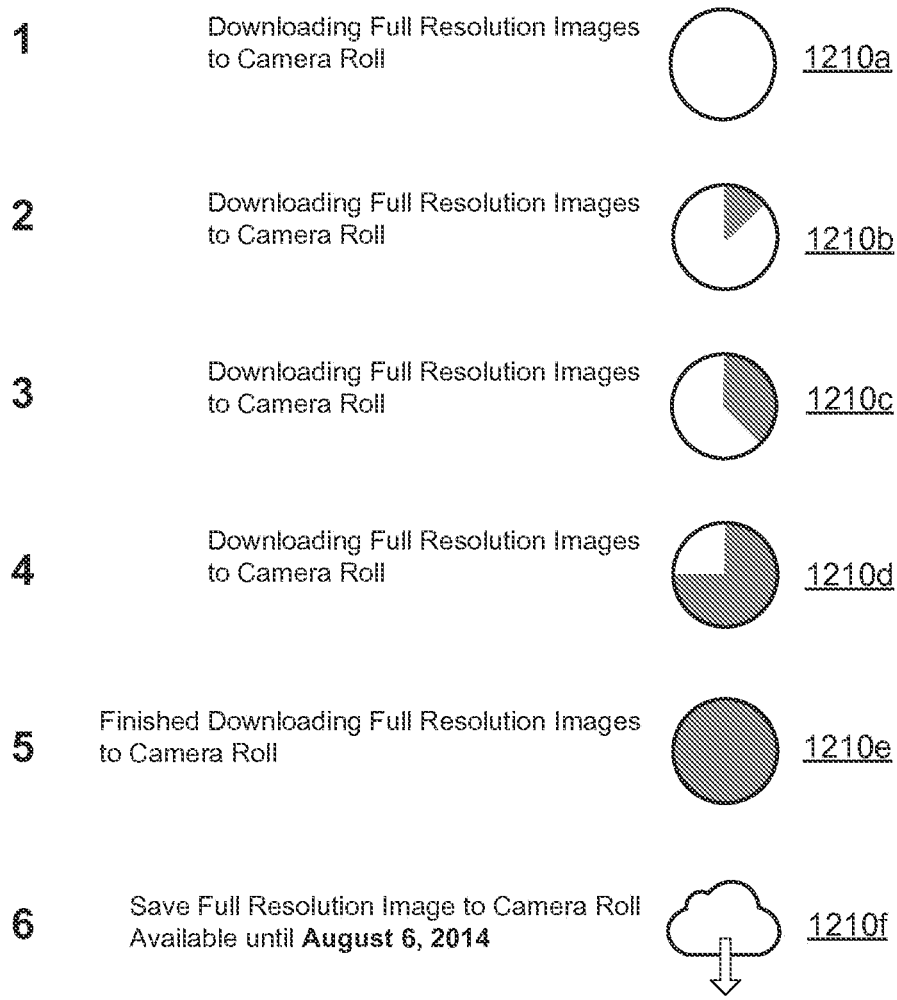
FIG. 12 illustrates a sequence of download indicators in the message view of an email message, according to some embodiments.

FIG. 12 illustrates a sequence 1-5 of UI download elements 1210 indicating download status of the attachment from the cloud server to a device on which the email client module locally stores the attachment. In one embodiment, the attachment includes one or more photos are received from the cloud server by the image management module 144 in the download process. Upon receiving the photos, the image management module 144 stores them at specified location on the device, e.g. the "camera roll," which is accessible by other applications. UI download element 1210a represents the start of the download process with the display of the empty circle indicating that no percentage of the attachment has been downloaded by the email client module. UI download element 1210b-1210d with an increasing circular segment visibly distinguished from the empty circle indicates that a percentage of the attachment has been downloaded. In one embodiment, the displayed ratio of the filled circular segment to the entire circle is proportional to the downloaded percentage of the attachment. In another embodiment, an UI progress bar is displayed in addition to the UI download element. After the UI download elements 1210e indicates the entire attachment has been downloaded, the UI download element 1210e is replaced by the element 1210f to indicate that the attachment is still available for downloading if the expiration date has no passed. Alternatively, the UI download element 1210e is replaced by an element (not shown) indicating that the attachment has been successfully downloaded. In one embodiment, after successfully downloading the attachment, the UI download element changes to an element 1314 that indicates that the attachment is no longer available for additional downloads as shown FIG. 13C. In yet another embodiment of the recipient's email client module, the UI download element is static and does not change over time.

Figure 13A:
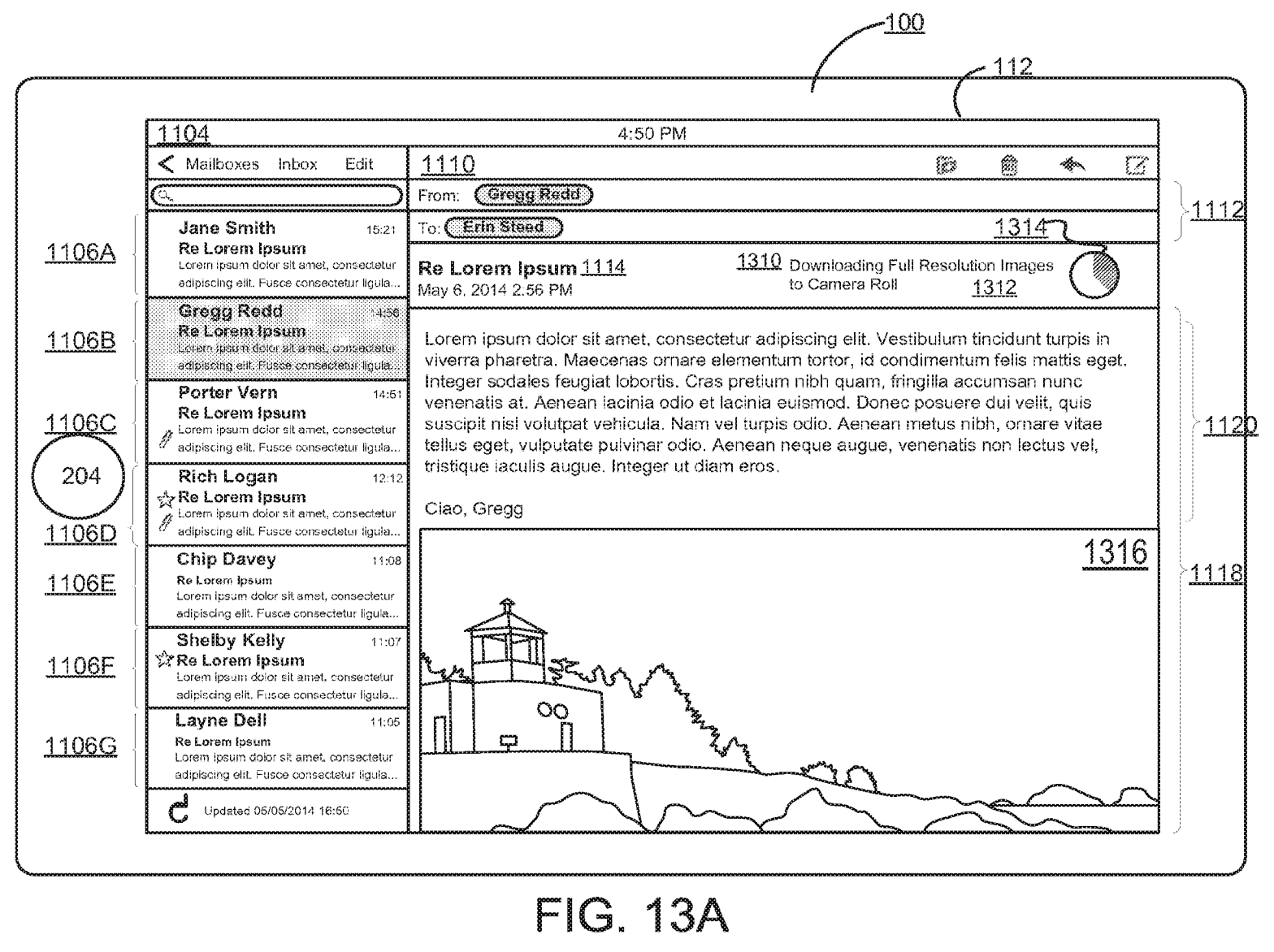
Figure 13B:
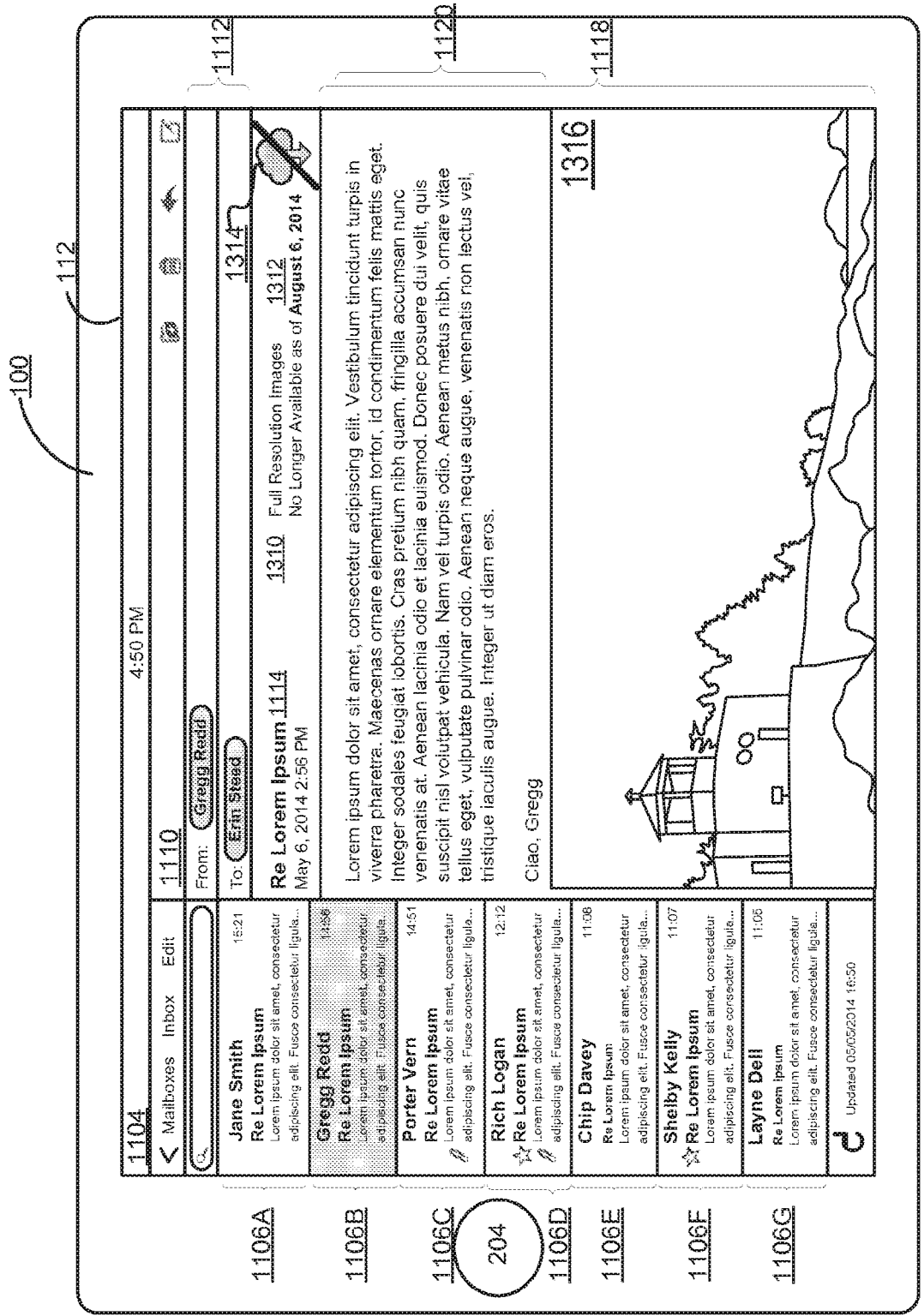
Figure 13C:
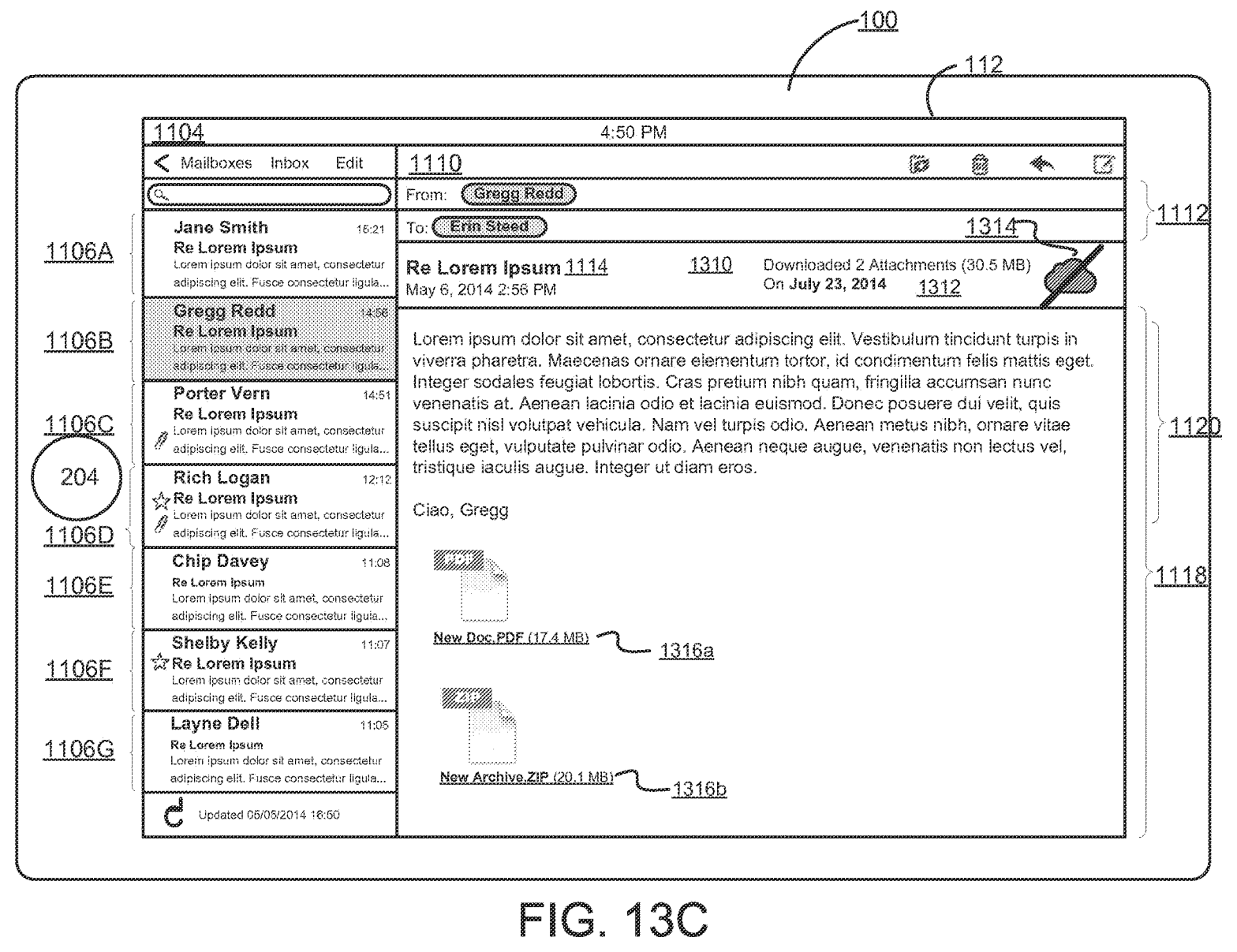

FIGS. 13A-13C illustrate an application view 1104 of an email application displaying email messages updates of the UI element 1310 when downloading from the cloud server 510 or after expiration of the attachment, according to some embodiments. As illustrated in FIG. 13A, the UI element 1310 includes text 1312 and UI download element 1314 indicative of the email client module 140 being in the process of downloading the attachment, whereas FIGS. 13B and 13C illustrate the UI element 1310 and corresponding text message 1312 and UI download element 1314 when the link of the location of the attachment on the cloud server has expired. Any links 1316 embedded in the body of the message for attachment, e.g. links associated with the embedded low resolution images or icons representing files including, but not limited to portable document or archive files, point to the location of the downloaded attachment. In case of the corresponding photo or file has not previously been successfully downloaded prior to the expiration date the links 1316 are removed from the email message.

Figure 14A:
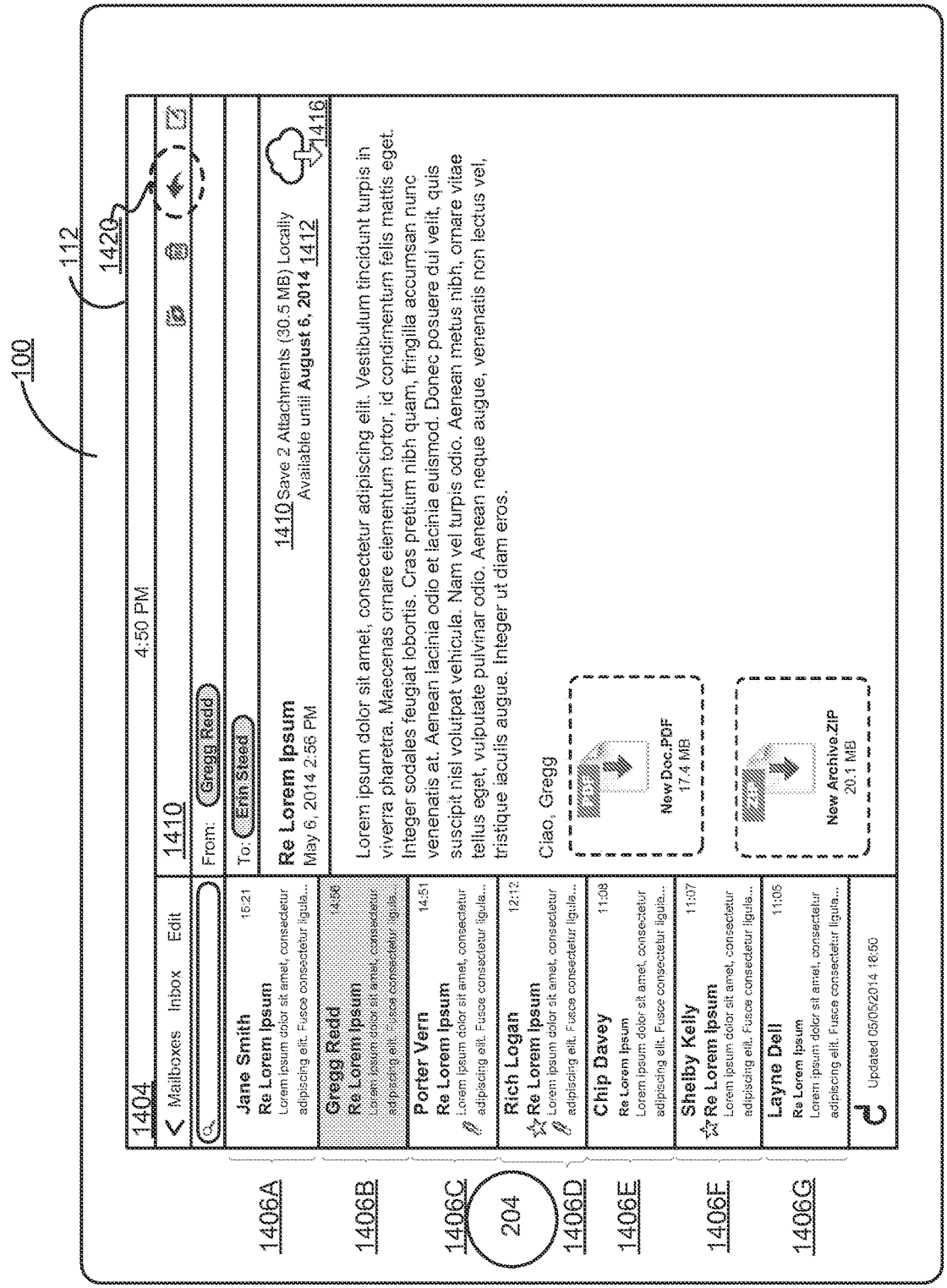
FIGS. 14A-C illustrate gestures for and methods of forwarding of a message including one or more large attachments in an application view of an email application, according to some embodiments.
Figure 14B:
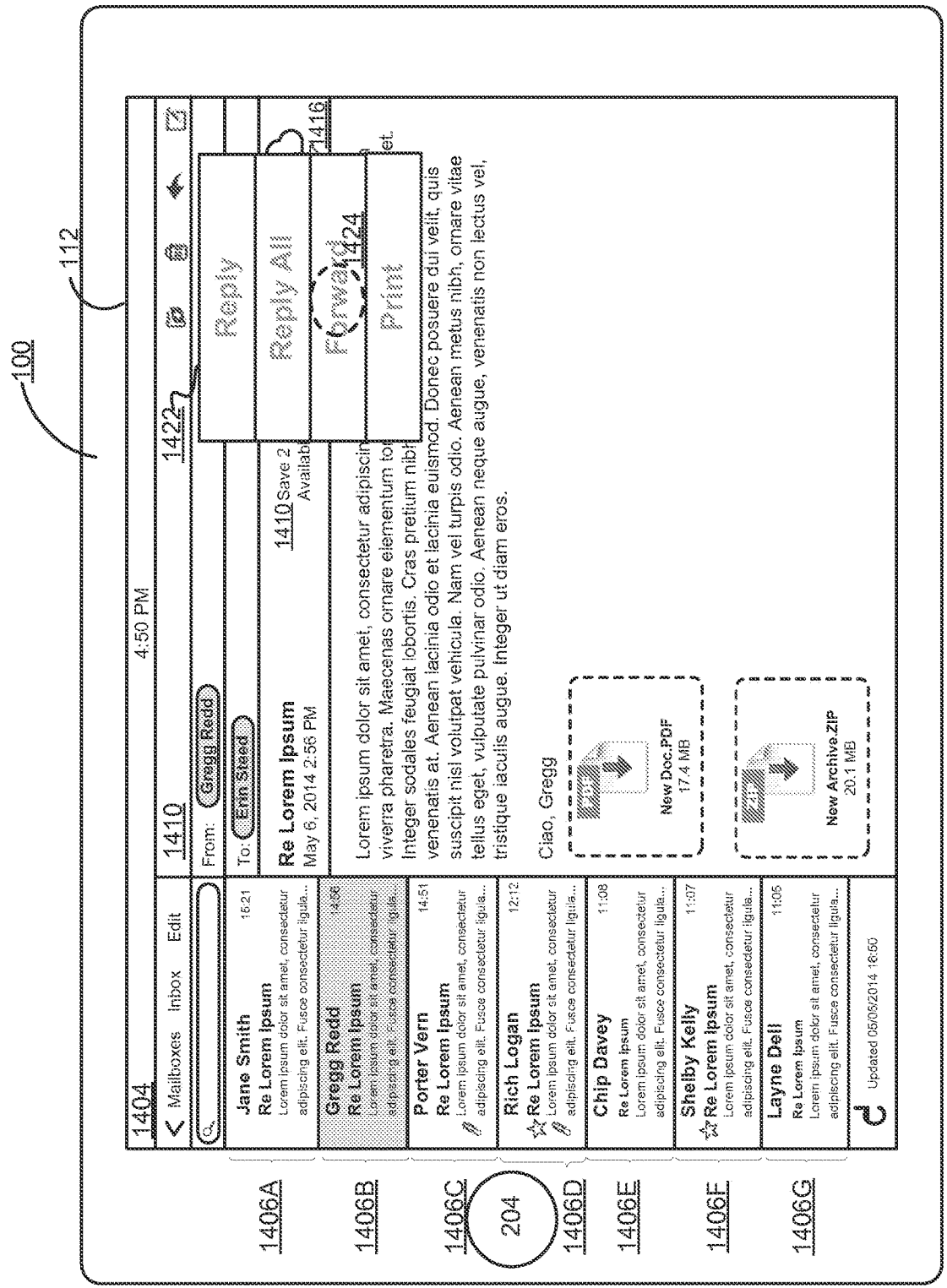
Figure 14C:
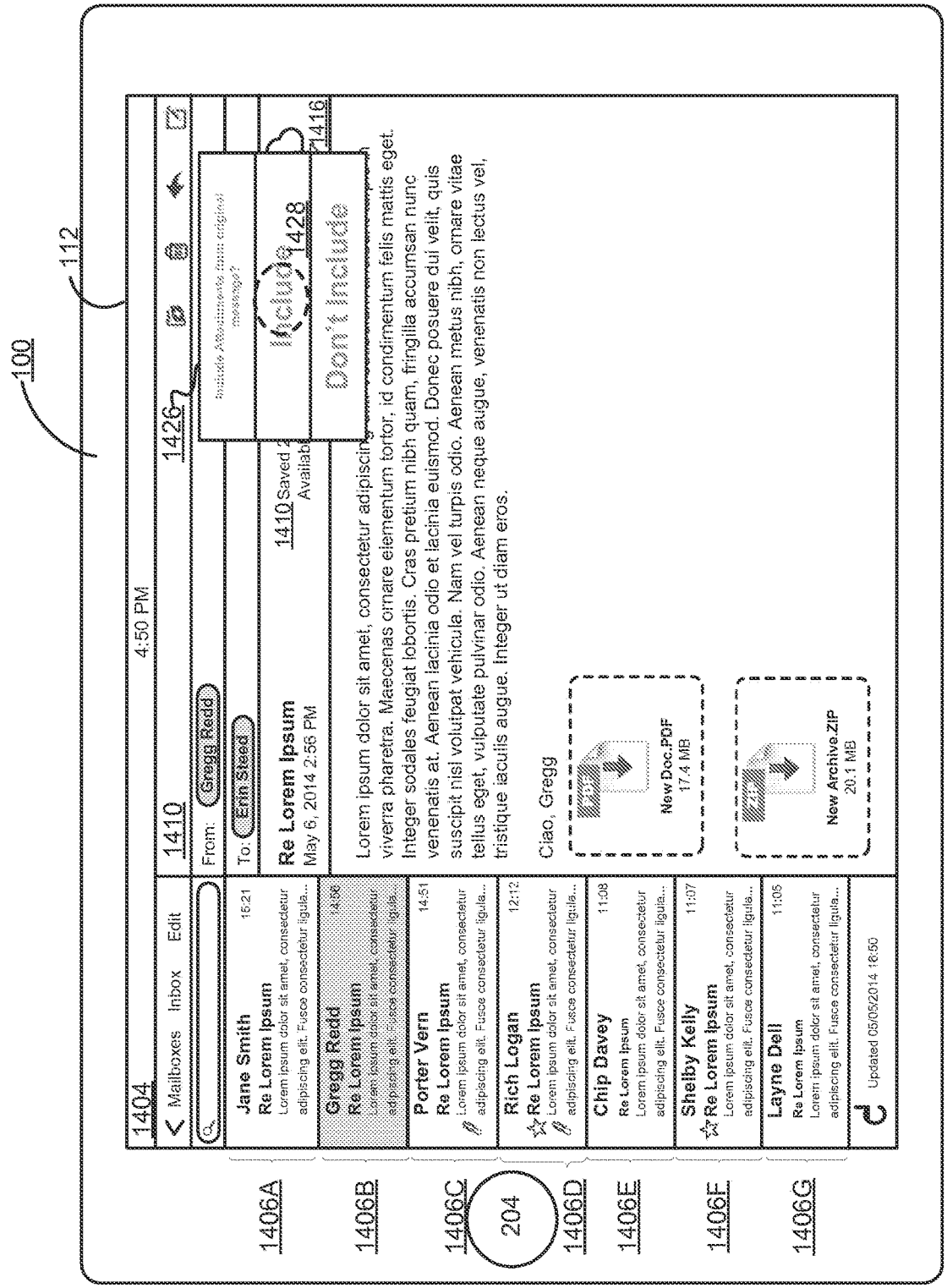
Figure 15:
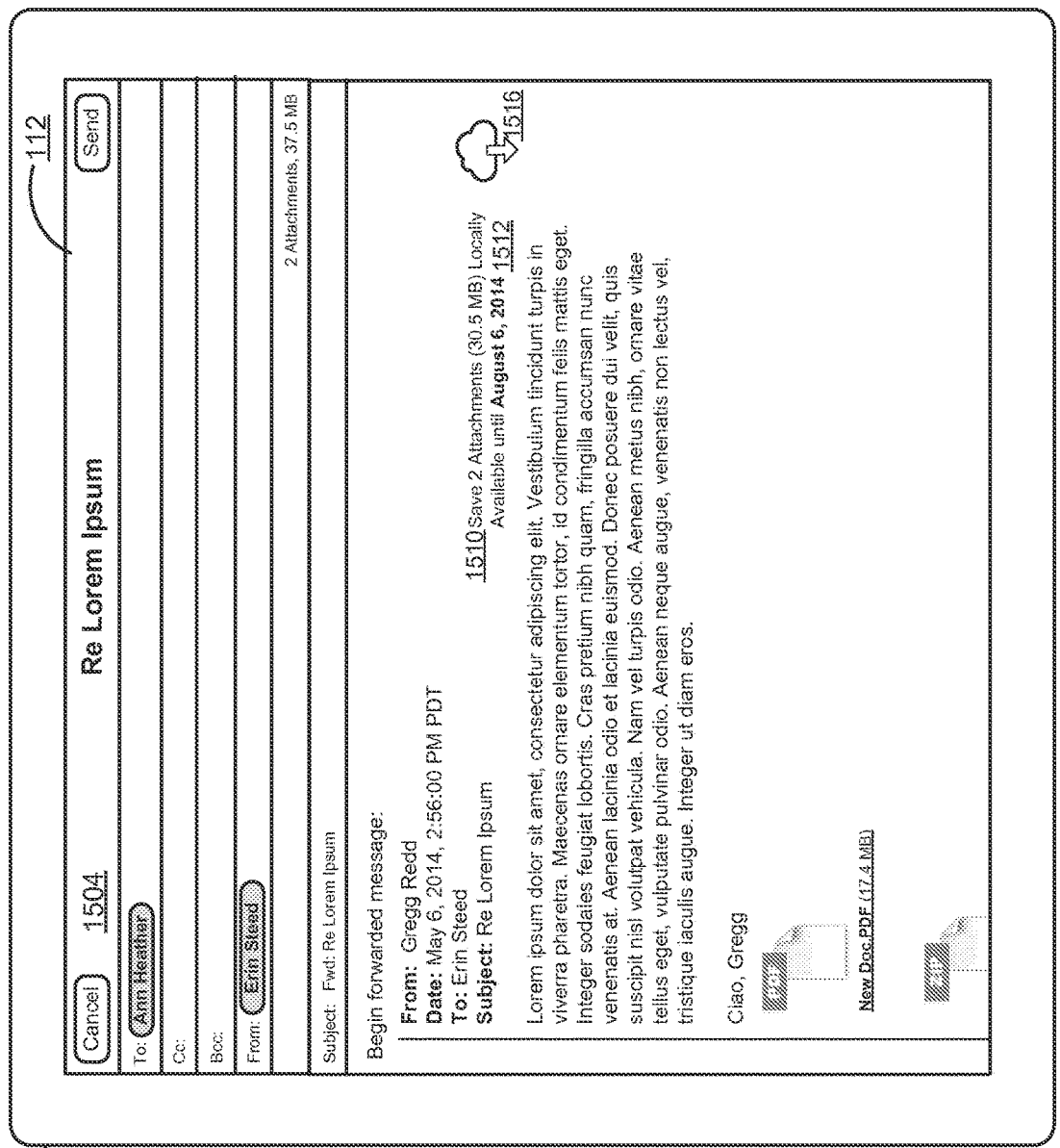
FIG. 15 illustrates a composition view of a forwarded message including one or more large attachments, according to one embodiment.

FIGS. 14A-14C illustrate an application view 1404 of an email application displaying gestures for forwarding an email message with an attachment and an embedded UI element 1410, according to some embodiments. In response to contact 1420 on a reply element of the message section 1410, as shown in FIG. 14A, the device 100 displays a reply sheet 1422 for reply options. As illustrated in FIG. 14B, these reply option may include the following actions to take with the email message 1406B: reply, reply all, forward, and print, according to one embodiment. The reply options are not limited to these actions. In response to contact 1422 on the forward element of the reply sheet 1422, the device 100 displays an include sheet 1426 for attachment options that may include the following actions to take with the attachment of the forwarded email message 1406B: include or don't include, according to the embodiment illustrated in FIG. 14C. As when composing an email message, responsive to the contact 1428 that selects to include the attachment, the email client module 140 provides a sheet 1010 of send options for sending the email message including the attachment as shown in FIGS. 10A and 10B. Forwarding the email message with the attachment by using the cloud server involves the same steps as described above with respect to FIGS. 9 and 10A-10D. FIG. 15 shows an application 1504 for composing the forwarded email message similar to the one shown in FIG. 8B.

Figure 16A:
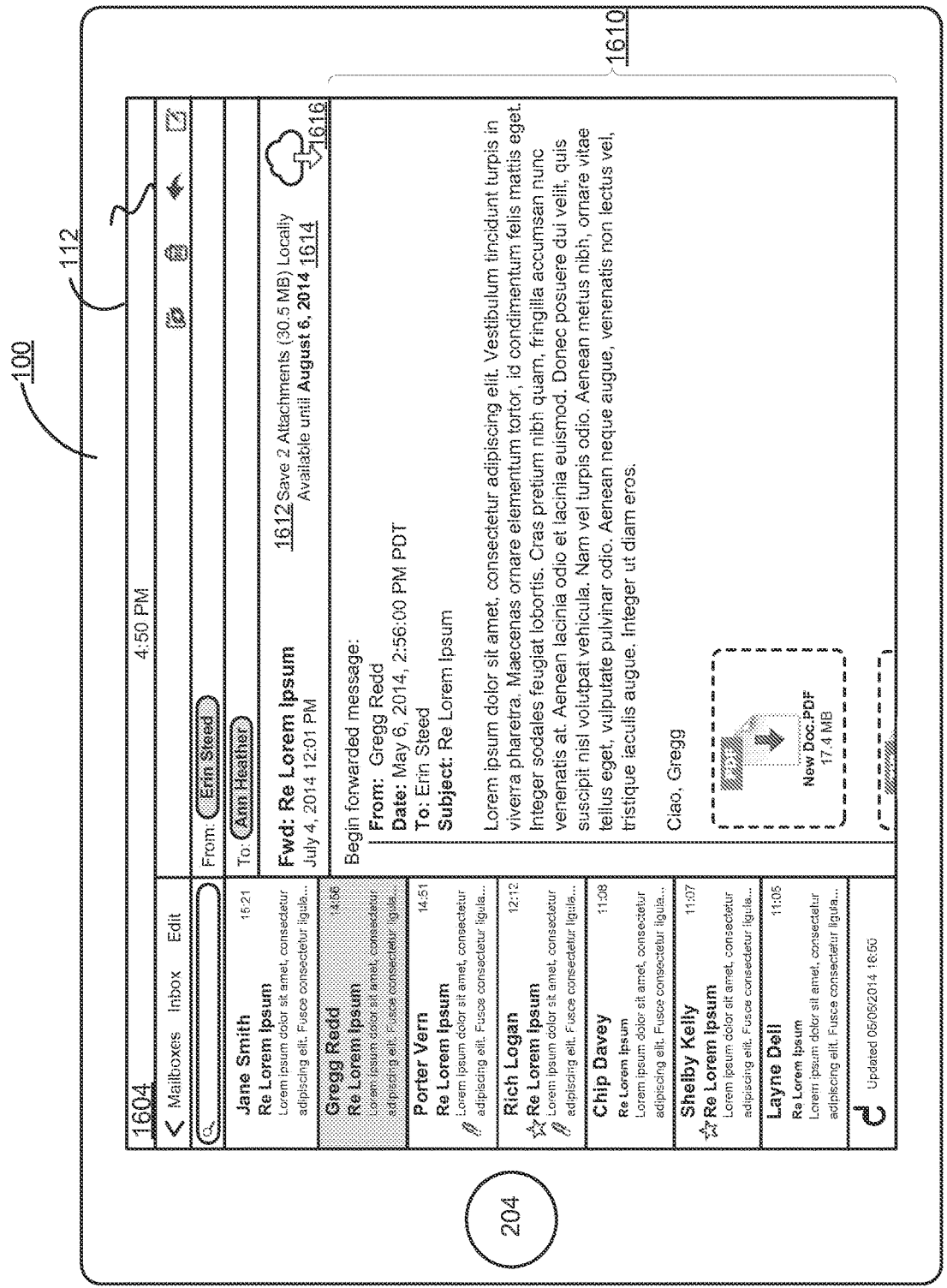
FIGS. 16A-C illustrate application views of forwarded messages including an embedded link to an attachment stored on a cloud servers and download gestures, according to some embodiments.
Figure 16B:
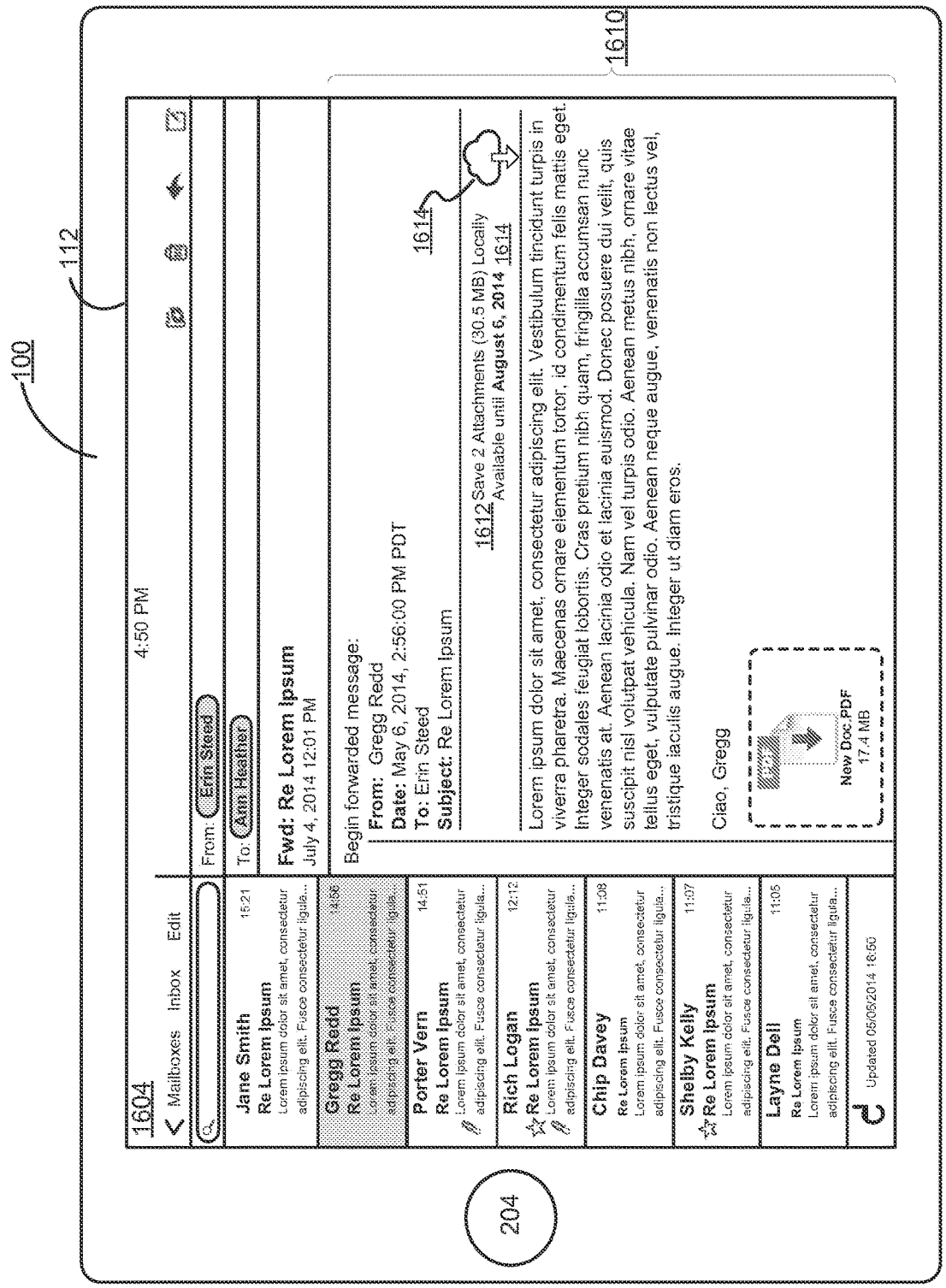
Figure 16C:
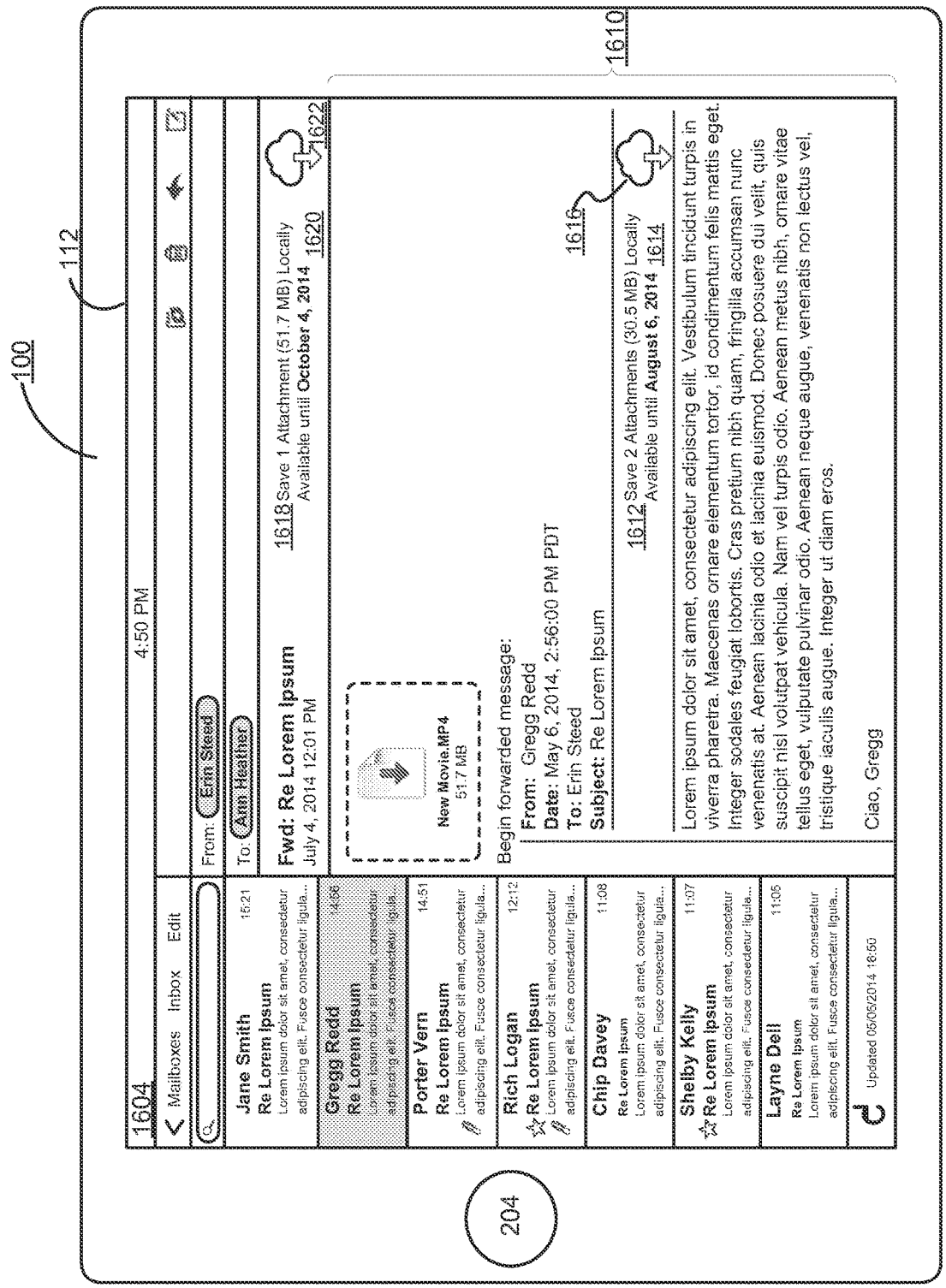

FIGS. 16A-16C illustrate an application view 1604 of an email application displaying email messages forwarded with attachments using the cloud server 510, according to some embodiments. In case of forwarding the message without including any new attachment, the UI element 1612 displays the same information as the UI element 1510 of the original message. In this case, the email client server 140 does not send a request for uploading of the original attachment to the cloud server, even in the case that the original attachment has expired on the cloud server. In case of new attachment to the forwarded email message, the email client server 140 provides the user with the option of sending the attachment through the cloud server as described with respect to FIGS. 8A, 8B and 9. The UI element 1618 represents the validity information for the new attachment, whereas the UI element 1612 refers to the original attachments as shown in FIG. 16C. The steps of sending the new attachment using the cloud server are the same as described above with respect to FIG. 9.

The disclosure herein has been described in particular detail with respect to one possible embodiment. Those of skill in the art will appreciate that other embodiments may be practiced. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the embodiments disclosed herein include process steps and instructions described herein in the form of an algorithm. It should be noted that the process steps and instructions could be embodied in software, firmware or hardware, and when embodied in software, could be downloaded to reside on and be operated from different platforms used by real time network operating systems.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The embodiments disclosed herein are well suited to a wide variety of computer network systems over numerous topologies. Within this field, the configuration and management of large networks includes storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure herein is intended to be illustrative, but not limiting, of the scope of the invention, which is set forth in the following claims.

What is claimed is:

1. An electronic device, comprising:
one or more processors; and
memory storing one or more programs configured to be executed by the one or more processors, the one or more programs including instructions for:

receiving an email message comprising a link to a location of an attachment associated with the email message on a server, wherein the attachment is not embedded within the email message;

responsive to an action opening the email message, opening the email message and displaying the link;

responsive to an action selecting the link to the location of the attachment retrieving the attachment from the server; and responsive to retrieving the attachment from the server, storing the email message with the attachment being embedded within the email message.

2. A non-transitory computer-readable storage medium storing one or more programs configured to be executed by one or more processors of an electronic device, the one or more programs including instructions for:

receiving an email message comprising a link to a location of an attachment associated with the email message on a server, wherein the attachment is not embedded within the email message;

responsive to an action opening the email message, opening the email message and displaying the link;

responsive to an action selecting the link to the location of the attachment retrieving the attachment from the server; and responsive to retrieving the attachment from the server, storing the email message with the attachment being embedded within the email message.

3. A method, comprising:

receiving an email message comprising a link to a location of an attachment associated with the email message on a server, wherein the attachment is not embedded within the email message;

responsive to an action opening the email message, opening the email message and displaying the link;

responsive to an action selecting the link to the location of the attachment retrieving the attachment from the server; and responsive to retrieving the attachment from the server, storing the email message with the attachment being embedded within the email message.

4. The electronic device of claim 1, the one or more programs further including instructions for:

responsive to the action opening the email message, opening the email message and displaying the link and a visual indication of a validity status corresponding to validity information of the link.

5. The electronic device of claim 4, the one or more programs further including instructions for:

responsive to retrieving the attachment from the server, updating the visual indication and storing the email message with the attachment being embedded within the email message.

6. The non-transitory computer-readable storage medium of claim 2, the one or more programs further including instructions for:

responsive to the action opening the email message, opening the email message and displaying the link and a visual indication of a validity status corresponding to validity information of the link.

7. The non-transitory computer-readable storage medium of claim 6, the one or more programs further including instructions for:

responsive to retrieving the attachment from the server, updating the visual indication and storing the email message with the attachment being embedded within the email message.

8. The method of claim 3, further comprising:

responsive to the action opening the email message, opening the email message and displaying the link and a visual indication of a validity status corresponding to validity information of the link.

9. The method of claim 8, further comprising:

responsive to retrieving the attachment from the server, updating the visual indication and storing the email message with the attachment being embedded within the email message.

\* \* \* \* \*